(12) United States Patent
Sakai

(10) Patent No.: US 10,767,650 B2
(45) Date of Patent: Sep. 8, 2020

(54) DRIVE DEVICE FOR ELECTRIC COMPRESSOR

(71) Applicant: DENSO CORPORATION, Kariya, Aichi-pref. (JP)

(72) Inventor: Koji Sakai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 266 days.

(21) Appl. No.: 15/741,166

(22) PCT Filed: Jun. 23, 2016

(86) PCT No.: PCT/JP2016/068712
§ 371 (c)(1),
(2) Date: Dec. 29, 2017

(87) PCT Pub. No.: WO2017/010256
PCT Pub. Date: Jan. 19, 2017

(65) Prior Publication Data
US 2018/0187681 A1    Jul. 5, 2018

(30) Foreign Application Priority Data

Jul. 14, 2015 (JP) ................................. 2015-140823

(51) Int. Cl.
*F04C 29/00* (2006.01)
*F04C 28/06* (2006.01)
(Continued)

(52) U.S. Cl.
CPC ......... *F04C 28/06* (2013.01); *B60H 1/00321* (2013.01); *B60H 1/00428* (2013.01);
(Continued)

(58) Field of Classification Search
CPC .......... H02P 6/20; H02P 27/085; H02P 27/06; H02P 27/08; H02P 29/68; H02P 29/40;
(Continued)

(56) References Cited

U.S. PATENT DOCUMENTS

2008/0278102 A1    11/2008   Taniguchi
2015/0155806 A1*    6/2015   Tsukamoto ............. F04B 49/06
                                                        318/400.11
2016/0352241 A1*   12/2016   Takahashi ............. H02M 5/458

FOREIGN PATENT DOCUMENTS

JP      H07027909 U    5/1995
JP      2003102193 A   4/2003
(Continued)

*Primary Examiner* — Essama Omgba
*Assistant Examiner* — Stephen A Mick
(74) *Attorney, Agent, or Firm* — Harness, Dickey & Pierce, P.L.C.

(57) ABSTRACT

A drive device of a compressor, including an inverter circuit formed of a plurality of switching elements, a drive unit that switches the switching elements, a determination unit that, when the compression mechanism restarts, determines whether a pressure difference of the compression mechanism is equal to or above a predetermined value, a restart unit that sets a number of times that the switching elements are switched per unit time during an initial predetermined period when the compression mechanism begins to restart and controls the drive unit, where the restart unit sets the number of times that the switching elements are switched per unit time to be lower when the determination unit determines that the pressure difference is equal to or above the threshold as compared to when the determination unit determines that the pressure difference is less than the threshold.

12 Claims, 11 Drawing Sheets

(51) Int. Cl.
| | |
|---|---|
| *H02P 27/06* | (2006.01) |
| *H02P 6/20* | (2016.01) |
| *H02P 27/08* | (2006.01) |
| *H02P 29/40* | (2016.01) |
| *H02P 29/68* | (2016.01) |
| *B60H 1/00* | (2006.01) |
| *F04C 28/08* | (2006.01) |
| *F04C 28/28* | (2006.01) |
| *F04C 18/02* | (2006.01) |

(52) U.S. Cl.
CPC ......... *B60H 1/00464* (2013.01); *F04C 28/08* (2013.01); *F04C 28/28* (2013.01); *H02P 6/20* (2013.01); *H02P 27/06* (2013.01); *H02P 27/08* (2013.01); *H02P 27/085* (2013.01); *H02P 29/40* (2016.02); *H02P 29/68* (2016.02); *F04C 18/0207* (2013.01); *F04C 29/0085* (2013.01); *H02P 2209/01* (2013.01)

(58) Field of Classification Search
CPC ...... H02P 2209/01; F04C 28/28; F04C 28/08; F04C 28/06; F04C 29/0085; F04C 18/02; B60H 1/00464; B60H 1/00428; B60H 1/00321; F25B 49/022; F25B 49/025; F25B 2600/027; F25B 2700/19; F25B 2700/193; F25B 2700/1517

See application file for complete search history.

(56) References Cited

FOREIGN PATENT DOCUMENTS

| | | | |
|---|---|---|---|
| JP | 2008306914 A | 12/2008 | |
| JP | 2014003802 A | 1/2014 | |

\* cited by examiner

DRIVE DEVICE FOR ELECTRIC COMPRESSOR

CROSS REFERENCE TO RELATED APPLICATIONS

This application is a U.S. National Phase application under 35 U.S.C. 371 of International Application No. PCT/JP2016/068712 filed on Jun. 23, 2016 and published in Japanese as WO 2017/010256 A1 on Jan. 19, 2017. This application is based on and claims the benefit of priority from Japanese Patent Application No. 2015-140823 filed on Jul. 14, 2015. The entire disclosures of all of the above applications are incorporated herein by reference.

TECHNICAL FIELD

The present disclosure relates to a drive device for an electric compressor.

BACKGROUND ART

Conventionally, for example as described in Patent Literature 1, startup controls for a synchronous motor drive device of an electric compressor have considered both startup performance with respect to a differential pressure between low pressure refrigerant and high pressure refrigerant, as well as the life span of an inverter circuit.

In Patent Literature 1, a target current value for a startup current that flows from an inverter circuit to a stator coil for a following startup is determined based on a current value that flows from the inverter circuit to the stator coil when a stop command for a compressor is generated.

If the current value is large when the stop command for the compressor is generated, a pressure difference is considered to be large, and the target current value is set to be large. If the current value is small when the stop command for the compressor is generated, the pressure difference is considered to be small, and the target current value is set to be small.

PRIOR ART LITERATURES

Patent Literature

Patent Literature 1: JP 2014-3802 A

SUMMARY OF INVENTION

According to the drive device of the above described Patent Literature 1, as mentioned above, the target current value for the startup current is determined based on the current value that flows from the inverter circuit to the stator coil when the stop command for a compressor is generated. However, if the current value is large, the pressure difference is considered to be large, and the target current value is set to be large. For this reason, when the pressure difference is large, the inverter circuit may generate a large amount of heat.

According to the present disclosure, an object is to provide a drive device of an electric compressor that, when restarting the electric compressor after being stopped, heat generation may be suppressed from an inverter circuit when a differential pressure is large.

According to one view of the present disclosure, a drive device, of an electric compressor that drives a compression mechanism to compress a fluid due to a rotation force of a rotor which is rotated by a rotating magnetic field generated from a stator coil of a synchronous motor, includes an inverter circuit formed of a plurality of switching elements, a drive unit that switches the plurality of switching elements to flow an alternating current from the inverter circuit to the stator coil based on a direct current voltage output from a direct current power source to generate the rotating magnetic field from the stator coil, a determination unit that, when the compression mechanism restarts after a stoppage of the compression mechanism, determines whether a pressure difference between a fluid intake side and a fluid discharge side of the compression mechanism is equal to or above a predetermined value, and a restart unit that sets a number of times that the switching elements are switched per unit time during an initial predetermined period when the compression mechanism begins to restart, and controls the drive unit such that an alternating current flows from the inverter circuit to the stator coil, the alternating current causing a rotation speed of the rotor to increase until a predetermined rotation speed when the compression mechanism restarts, where the restart unit sets the number of times that the switching elements are switched per unit time to be lower when the determination unit determines that the pressure difference is equal to or above the threshold as compared to when the determination unit determines that the pressure difference is less than the threshold Due to this, when the pressure difference is equal to or above the threshold, as compared to when the pressure difference is lower than the threshold, the number of switches per time unit during the initial predetermined period when the rotor begins to restart may be reduced. For this reason, when the rotor is restarted after the compression mechanism is stopped, it is possible to suppress heat generated in the inverter circuit when the pressure difference is large.

However, the number of switches is the number of times that the plurality of switching units change from one of on or off state to the other state. The positive bus switching elements are the switching elements of the plurality of switching elements which are connected to the positive bus. The negative switching elements are the switching elements of the plurality of switching elements which are connected to the negative bus.

Further, from another perspective, the drive device of the electric compressor is applied to a vehicle including a vehicle device that generates operation sounds when operated, and includes a masking unit that performs a control of operating the vehicle device when the determination unit determines that the pressure difference is equal to or above the threshold, where the masking unit causes the vehicle device to generate the operation sounds when vibration sounds are generated from the inverter circuit due to the carrier frequency when the pair of switching elements in each phase switches.

Due to this, the vibration noises from the inverter circuit may be masked by operation sounds from the vehicle device, and it is possible to prevent an uncomfortable feeling by passengers due to the vibration sounds from the inverter.

DESCRIPTION OF EMBODIMENTS

Figure 1:
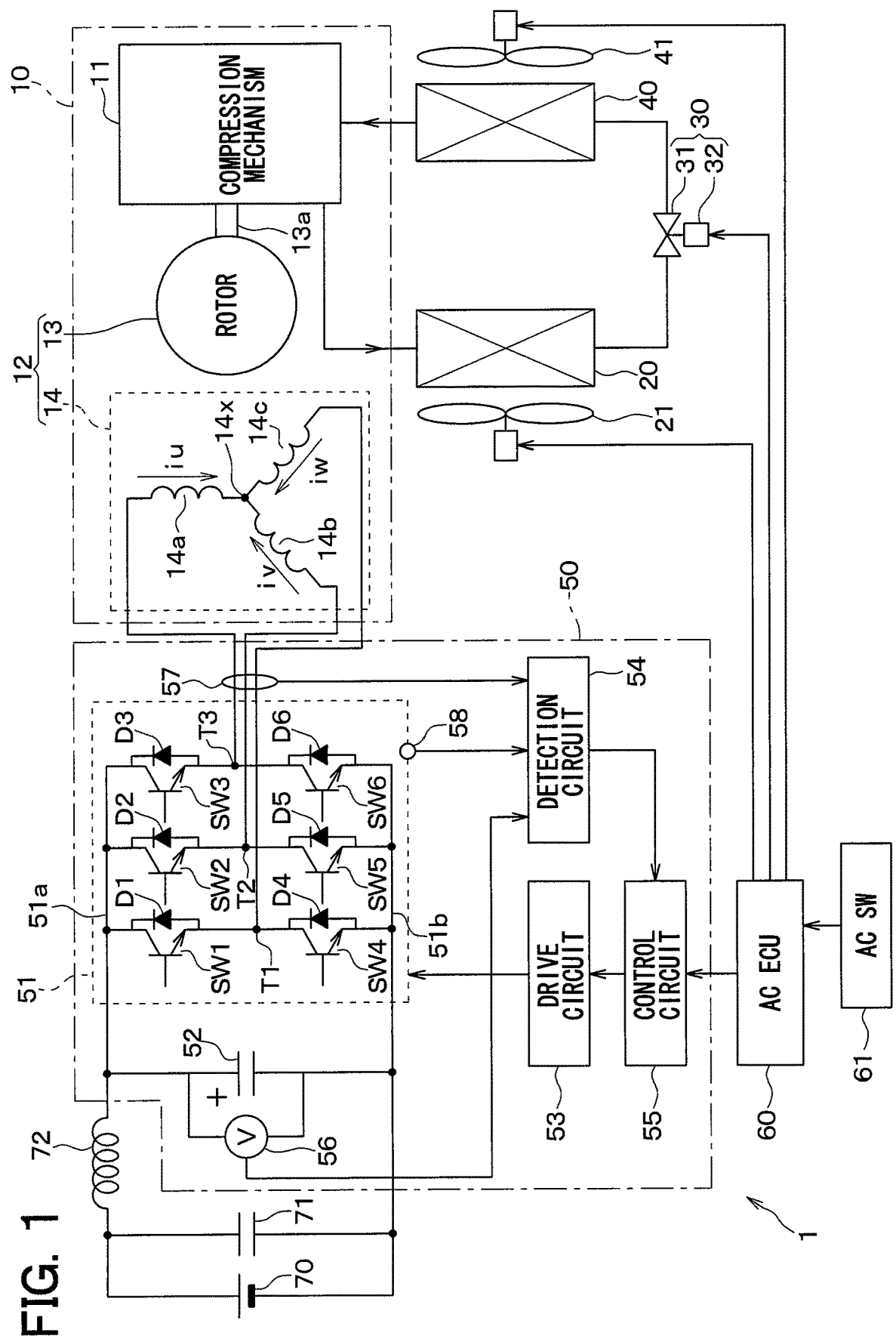
FIG. 1 is a view showing an electrical configuration of a refrigeration cycle device according to a first embodiment.

Hereinafter, embodiments will be described with reference to the figures. Further, in each of the following embodiments, portions which are the same or equivalent to each other will be denoted with the same reference numerals in the figures to simplify explanations.

First Embodiment

FIG. 1 shows a first embodiment of a refrigeration cycle device 1 equipped with a drive device for an electric compressor in accordance with the present disclosure. The refrigeration cycle device 1 is a vehicle mounted refrigeration cycle device which is mounted on a vehicle. A vehicle according the present embodiment refers to an electric vehicle or a hybrid vehicle equipped with a motor for propulsion.

The refrigeration cycle device 1 is configured as a vehicle mounted air conditioning device, and includes an electric compressor 10, a condenser 20, a pressure reducing valve 30, an evaporator 40, a drive device 50, and an electronic control unit 60.

The electric compressor 10 includes a compression mechanism 11 and a synchronous motor 12. The compression mechanism 11 sucks in, compresses, and discharges refrigerant (i.e., a fluid) due to a rotation force of a rotor 13 of the synchronous motor 12. The compression mechanism 11 may be, for example, a scroll type compressor or a rotary type compressor.

The synchronous motor 12 includes the rotor 13 and a stator coil 14. The rotor 13 outputs a rotation force to the compression mechanism 11 through a rotary shaft 13a. The rotor 13 may, for example, be embedded with a plurality of permanent magnets.

The stator coil 14 includes a U-phase coil 14a, a V-phase coil 14b, and a W-phase coil 14c in a star connection with a neutral point 14x. The stator coil 14 applies a rotating magnetic field to the rotor 13.

The condenser 20 is a heat exchanger that cools high pressure refrigerant discharged from the compression mechanism 11 with vehicle cabin external air which is blown by an electric fan 21. The electric fan 21 generates a flow in the vehicle cabin external air which passes through the condenser 20. The condenser 20 and the electric fan 21 are disposed within an engine room of the vehicle.

The pressure reducing valve 30 reduces the pressure of the high pressure refrigerant cooled by the condenser 20. Specifically, the pressure reducing valve 30 includes a valve body 31 and an electric actuator 32. The valve body 31 controls the cross section area of a refrigerant passage between a refrigerant outlet of the condenser 20 and a refrigerant inlet of the evaporator 40. The electric actuator 32 drives this valve body.

The evaporator 40 cools vehicle cabin internal air, which is blown by an electric fan 41, with low pressure refrigerant whose pressure was reduced by the pressure reducing valve 30. The electric fan 41 generates a flow in the vehicle cabin internal air that passes through the evaporator 40. The evaporator 40 and the electric fan 41 are disposed underneath an instrument panel within the vehicle cabin, and form a vehicle cabin internal air conditioning device.

The drive device 50 includes an inverter circuit 51, a capacitor 52, a drive circuit 53, a detection circuit 54, a control circuit 55, a voltage sensor 56, a current sensor 57, and a temperature sensor 58.

The inverter circuit 51 circulates a three phase alternating current in the stator coil 14 based on an output voltage of a high voltage source 70. The high voltage source 70 is a direct current power source that outputs a direct current voltage to the inverter circuit 51 etc. The inverter circuit 51 includes switching elements SW1, SW2, SW3, SW4, SW5, SW6 and diodes D1, D2, D3, D4, D5, D6.

The switching elements SW1, SW4 are connected in series between a negative bus 51b and a positive bus 51a. The switching elements SW2, SW5 are connected in series between the negative bus 51b and the positive bus 51a. The switching elements SW3, SW6 are connected in series between the negative bus 51b and the positive bus 51a.

The positive bus 51a is connected to the positive electrode of the high voltage source 70, and the negative bus 51b is connected to the negative electrode of the high voltage source 70.

The switching elements SW1, SW4 are provided so as to correspond to the W-phase, and the W-phase coil 14c is connected to a common connection point T1 between the switching elements SW1, SW4. The switching elements SW2, SW5 are provided so as to correspond to the V-phase, and the V-phase coil 14b is connected to a common connection point T2 between the switching elements SW2, SW5. The switching elements SW3, SW6 are provided so as to correspond to the U-phase, and the U-phase coil 14a is connected to a common connection point T3 between the switching elements SW3, SW6.

Further, as the switching elements SW1, SW2, . . . SW6, for example semiconductor switching elements such as insulated gate bipolar switching elements, field-effect switching elements etc. may be used.

The diodes D1, D2, D3, D4, D5, D6 are disposed in anti-parallel with a corresponding switching element among the switching elements SW1, SW2, SW3, SW4, SW5, SW6.

The positive electrode of the capacitor 52 is connected to the positive bus 51a of the inverter circuit 51. The negative electrode of the capacitor 52 is connected to the negative bus 51b of the inverter circuit 51.

The positive electrode of a capacitor 71 is connected to the positive electrode of the high voltage source 70. The negative electrode of the capacitor 71 is connected to the negative electrode of the high voltage source 70. A coil 72 is connected between the positive electrode of the capacitor 52 and the positive electrode of the capacitor 71.

In the present embodiment, the coil 72 and the capacitors 52, 71 form an LC filter that stabilizes the voltage between the positive bus 51a and the negative bus 51b.

The drive circuit 53 outputs a pulse shaped control signal that operates the switching of the inverter circuit 51 through PWM control. Here, PWM control refers to a process of operating the switching of the inverter circuit 51 according to the ratio between a voltage command wave applied from the control circuit 55 and a carrier wave. The carrier wave in the present embodiment is a triangle wave that periodically changes from a reference voltage (or more specifically, a zero voltage potential) to a positive side and a negative side.

The detection circuit 54 converts detection signals from each of the sensors 56, 57, 58 into status values used for calculations in the control circuit 55. The voltage sensor 56 is a voltage sensor that detects the voltage between the positive electrode and the negative electrode of the capacitor 52. In the present embodiment, a resistive voltage divider type sensor or the like may be used as the voltage sensor 56.

The current sensor 56 detects each of a U-phase current iu, V-phase current iv, and W-phase current iw. The U-phase current iu is the current flowing from the common connection point T3 of the switching elements SW3, SW6 to the U-phase coil 14a. The V-phase current iv is the current flowing from the common connection point T2 of the switching elements SW2, SW5 to the V-phase coil 14b. The W-phase current iw is the current flowing from the common connection point T1 of the switching elements SW1, SW4 to the W-phase coil 14c.

Further, regarding the current flow directions of the currents iu, iv, iw in FIG. 1, the directions of the corresponding arrows represent positive. In the present embodiment, as the current sensor 57, for example a current transformer type, a Hall element type, or a shunt resistive type current sensor may be used.

The temperature sensor 58 is a sensor that detects the temperature of the inverter circuit 51. In the present embodiment, as the temperature sensor 58, for example a temperature sensor that detects the surface temperature or the ambient temperature of any one of the switching elements SW1, SW2, . . . SW6 may be used.

The control circuit 55 is formed of a microcomputer, a memory, a timer, etc., and executes a control process that controls the switching elements SW1, SW2, SW3, SW4, SW5, SW6 through the drive circuit 53 based on an output signal from the detection circuit 54 and a rotation speed command value Nm sent from the electronic control unit 60.

The electronic control unit 60 is an air conditioning electronic control unit 60. The electronic control unit 60 performs an air conditioning control process based on output signals from various air conditioning sensors, an air conditioning switch 61, etc. According to the air conditioning control process, the electronic control unit 60 controls the synchronous motor 12 through the drive device 50, and also controls the electric fans 21, 41 and the pressure reducing valve 30. The air conditioning switch 61 is operated by a passenger, and is a switch that commands the electric compressor 10 to operate and stop.

Further, the electronic control unit 60, the drive circuit 53, the detection circuit 54, and the control circuit 55 are operated by the output voltage of a low voltage source. The low voltage source is set to have a lower output voltage than the output voltage of the high voltage source 70.

Next, the operation of the refrigeration cycle device 1 of the present embodiment will be explained.

First, the electronic control unit 60 repeatedly determines whether the compression mechanism 11 should be started based on output signals from various air conditioning sensors, the air conditioning switch 61, etc. Then, based on the determination result of each determination, the electronic control unit 60 outputs an ON flag or an OFF flag to the control circuit 55 as an operation flag. For the control circuit, an ON flag is a startup command for starting the compression mechanism 11. Further, for the control circuit, an OFF flag is a stop command for stopping the compression mechanism 11.

In addition, the electronic control unit 60 calculates the rotation speed command value Nm based on output signals from various air conditioning sensors, the air conditioning switch 61, etc. The rotation speed command value Nm is a target rotation speed for the rotor 13.

Figure 2:
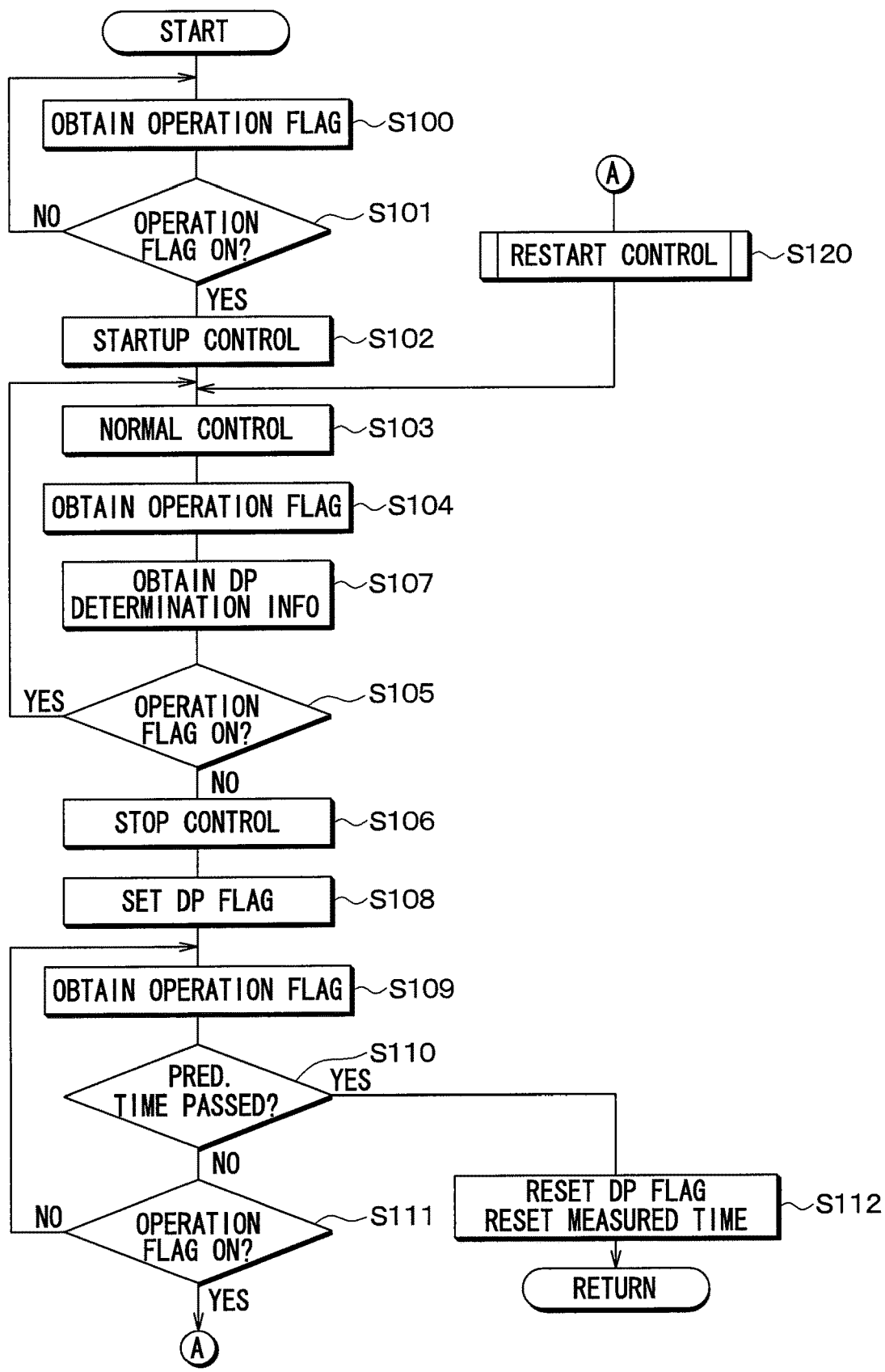
FIG. 2 is a flowchart showing a compressor control process of a control circuit of FIG. 1.
Figure 3:
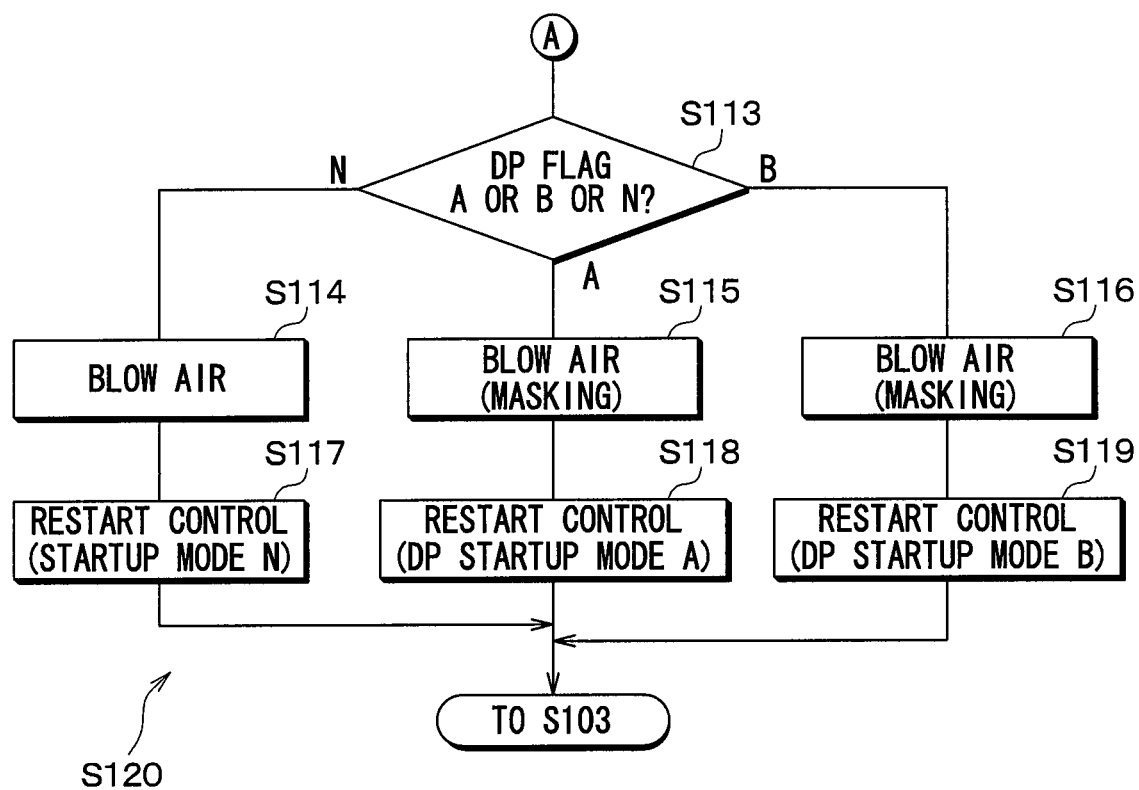
FIG. 3 is a flowchart showing details of a restart control process in FIG. 2

The control circuit 55 performs a compressor control process according to the flowcharts shown in FIGS. 2 and 3. FIG. 2 is a flowchart that shows the compressor control process. FIG. 3 is a flowchart that shows details of a restart control process in FIG. 2.

The execution of the compressor control process begins when a power switch is switched on and direct current power is supplied from the low voltage power source to the control circuit 55.

First, at step S100, the control circuit 55 obtains the operation flag from the electronic control unit 60. Next, the control circuit 55 determines whether the obtain operation flag is an ON flag (step S101). Then, when the operation flag is an OFF flag, a determination of NO is made at step S101, and the process returns to step S100. For this reason, when an OFF flag is repeatedly obtained as the operation flag, the operation flag obtaining process at step S100 and a NO determination at step S101 are repeated.

Next, when an ON flag is obtained as the operation flag, a YES determination is made at step S101. In accordance with this, a startup control at step S102 is performed. In the present embodiment, the startup control is a forced commutation control which starts rotating the rotor 13 and gradually increases the rotation speed of the rotor 13 until a predetermined rotation speed Nc.

Further, the predetermination rotation speed Nc is a rotation speed of the rotor 13 where an induced voltage generated in the stator coil 14 is equal or above a predetermined value, and the rotation speed of the rotor 13 may be calculated by the control circuit 55 from the detection values of the sensors 56, 57.

Specifically, the control circuit 55 calculates a command voltage wave for gradually increasing the actual rotation speed Na of the rotor 13 until reaching the predetermined rotation speed Nc. This voltage command wave is set such that the magnitude of the three phase alternating current flowing from the inverter circuit 51 to the stator coil 14 is a predetermined current value capable of starting the rotation of the rotor 13. Hereinafter, for convenience, the voltage command wave used in the forced commutation control is referred to as a voltage command wave VS. The voltage command wave VS is illustrated in FIG. 4.

The voltage command wave VS is formed of voltage command waves in each phase, and thus is a three phase command wave that includes a U-phase command wave VU, a V-phase command wave VV, and a W-phase command wave VW. The command waves VU, VV, VW are sine waves whose voltage periodically changes between positive and negative from a reference voltage which is equal to the reference voltage of a carrier wave Kn.

Figure 4:
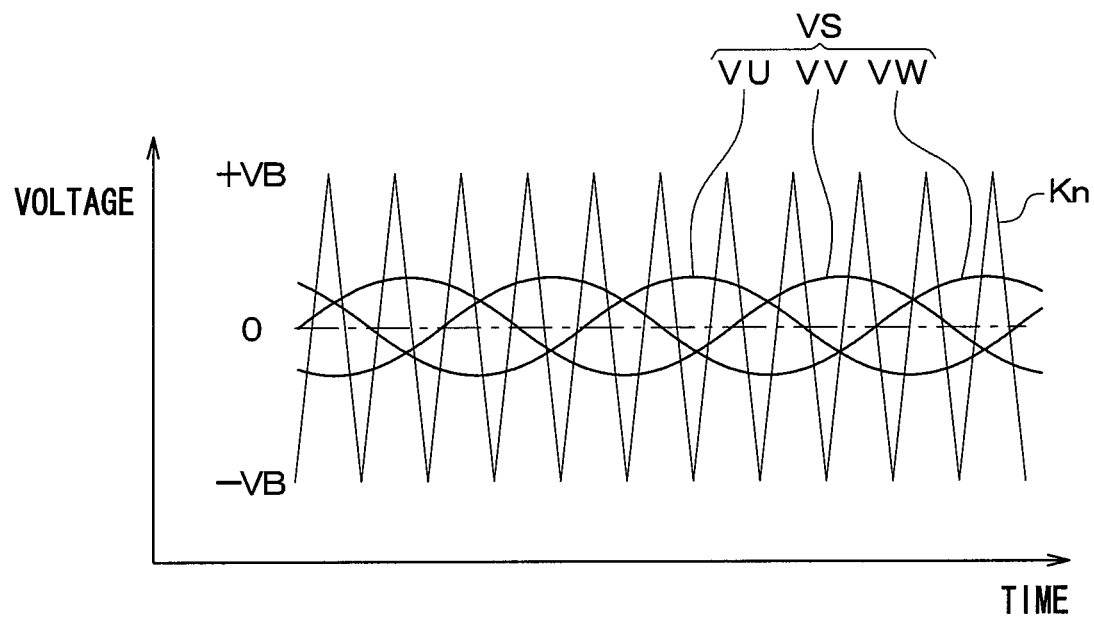
FIG. 4 is a view showing a carrier wave and voltage command waves for each phase used in a drive circuit of FIG. 1.

In the present embodiment, as shown in FIG. 4, the carrier wave Kn is a triangle wave which periodically changes from a reference voltage (or more specifically, a zero voltage potential) to a positive side and a negative side. The detection value of the voltage sensor 56 is set as the peak value VB of the carrier wave Kn. In this case, fpwm1 is used as the frequency of the carrier wave Kn (hereinafter referred to as a carrier frequency).

The control circuit 55 sets the above described carrier wave Kn and voltage command wave VS in the drive circuit 53. Accordingly, the drive circuit 53 compares the voltage command wave VS and the carrier wave Kn in each phase to determine which of the switching elements SW1, SW2, ... SW6 to turn on.

The U-phase command wave VU corresponds to the switching elements SW3, SW6. When the U-phase command wave VU is greater than the carrier wave Kn, the drive circuit 53 turns on the switching element SW3 which is toward the positive bus 51a, and turns off the switching element SW6 which is toward the negative bus 51b. When the U-phase command wave VU is less than the carrier wave Kn, the drive circuit 53 turns of the switching element SW3 and turns on the switching element SW6.

The V-phase command wave W corresponds to the switching elements SW2, SW5. Similar to the case of the U-phase command wave VU, the drive circuit 53 turns off one of the switching element SW2 which is toward the positive bus 51a and the switching element SW5 which is toward the negative bus 51b and turns on the other switching element according to a comparison between the V-phase command wave VV and the carrier wave Kn.

Similarly, the drive circuit 53 turns off one of the switching element SW1 which is toward the positive bus 51a and the switching element SW4 which is toward the negative bus 51b and turns on the other switching element according to a comparison between the W-phase command wave VW and the carrier wave Kn.

The drive circuit 53 determines which of the switching elements SW1, SW2, ... SW6 to turn on in this manner, and generates a control signal including this determined information. The drive circuit 53 outputs this control signal to the inverter circuit 51. Accordingly, the switching elements SW1, SW2, SW3, SW4, SW5, SW6 are operated to switch. Due to this, a three phase alternating current flows from the common connection points T1, T2, T3 to the stator coil 14. For this reason, a rotating magnetic field is generated from the stator coil 14. In accordance with this, the rotor synchronously rotates with the rotating magnetic field. Due to this, the rotation speed of the rotor 13 may gradually increase into reaching the predetermined rotation speed Nc.

Next, at step S103, the control circuit 55 executes a normal control process. First, a current command value Is is calculated based on the rotation speed command value Nm instructed from the electronic control unit 60. The current command value Is is information that represents, as a target value, the magnitude and phase of the three phase alternating current which should be output from the inverter circuit 51 to the stator coil 14.

Here, the actual rotation speed Na of the rotor 13 is obtained based on the detection value of the voltage sensor 56 and the detection value of the current sensor 57. Then, a voltage command wave is obtained to bring the actual rotation speed Na close to the rotation speed command value Nm and bring the detection value of the current sensor 57 close to the current command value Is. This voltage command wave includes a U-phase command wave, a V-phase command wave, and a W-phase command wave. It should be noted that the voltage command wave used in the normal control process is different from the voltage command wave VS used in the forced commutation control, so to differentiate these, the voltage command wave used in the normal control process will be referred to as a voltage command wave VSa.

Further, the control circuit 55 sets the voltage command wave VSa and the carrier wave Kn whose carrier frequency is fpwm1 to the drive circuit 53. For this reason, the drive circuit 53 compares the voltage command wave VSa and the carrier wave Kn in each phase to determine which of the switching elements SW1, SW2, ... SW6 to turn on. The drive circuit 53 outputs a control signal including this determined information to the inverter circuit 51.

For this reason, the switching elements SW1, SW2, SW3, SW4, SW5, SW6 are operated to switch. Due to this, a three phase alternating current flows from the common connection points T1, T2, T3 to the stator coil 14. For this reason, a rotating magnetic field is generated from the stator coil 14. In accordance with this, the rotor synchronously rotates with the rotating magnetic field. Due to this, the rotation speed of the rotor 13 may be controlled such that the rotation speed of the rotor 13 follows the rotation speed command value Nm.

The rotation force of the rotor 13 controlled in this manner is used to drive the compression mechanism 11. For this reason, the compression mechanism 11 sucks in refrigerant from the refrigerant outlet of the evaporator 40 and compresses this refrigerant, and then discharges high pressure refrigerant. For this reason, in the condenser 20, high pressure refrigerant is cooled by vehicle cabin external air blown by the electric fan 21. This cooled high pressure refrigerant is pressure reduced by the pressure reducing valve 30. Then, in the evaporator 40, the pressure reduced low pressure refrigerant absorbs heat from vehicle cabin internal air blown by the electric fan 41 and evaporates.

Further, the electric fans 21, 41 and the electric actuator of the pressure reducing valve 30 are controlled by the electronic control unit 60.

Next, at step S104, the operation flag is obtained from the electronic control unit 60. Further, a differential pressure (DP) determination information is obtained (step S107). This differential pressure determination information represents a refrigerant pressure difference between the refrigerant intake side and refrigerant discharge side of the compression mechanism 11.

In the present embodiment, for example, the temperature of the inverter circuit 51 detected by the temperature sensor 58 may be used as the differential pressure determination information.

Here, there is a correlation between the torque output from the rotor 13 to the compression mechanism 11 (hereinafter, simply referred to as torque) and the refrigerant pressure difference. The torque is generated by the three phase alternating current flowing from the inverter circuit 51 to the stator coil 14, and so there is a correlation between the torque and the three phase alternating current. In addition, heat generated from the inverter circuit 51 changes according to the magnitude of the three phase alternating current, so there is a correlation between heat and the three phase alternating current. For this reason, there is a correlation between the refrigerant pressure difference and heat. Accordingly, the refrigerant pressure difference may be estimated based on the temperature detected by the temperature sensor 58.

Next, the control circuit 55 determines whether the operation flag obtained at step S104 is an ON flag or not (step S105). When the operation flag is an ON flag, a YES determination is made at step S105. In accordance with this, the process returns to step S103. For this reason, as long as the operation flag is an ON flag, the normal control process (step S103), the operation flag obtaining process (step S104), the differential pressure determination information obtaining process (step S107), and the YES determination at step S105 are repeated.

In addition, each time the control circuit 55 performs step S107, the differential pressure determination information is repeatedly obtained. For this reason, the differential pressure determination information obtained during the N-th time performing step S107 is stored in memory and overwriting the differential pressure determination information obtained during the (N−1)-th time performing step S107. N, (N−1) refer to the number of times that step S107 is performed.

Next, if the operation flag obtained from the electronic control unit 60 at step S104 is an OFF flag, NO is determined at step S105, and the timer begins counting. The timer is a timer that counts the time elapsed since the NO determination at step S105. Hereinafter, the time measured by the timer is referred to as a measured time t.

Next, the process continues to step S106, and a stop control process is performed to stop the rotor 13. Specifically, a control signal that turns off all of the switching elements SW1, SW2, SW3, SW4, SW5, SW6 is output from the drive circuit 53 to the inverter circuit 51. In accordance with this, the inverter circuit 51 stops the flow of three phase alternating current from the inverter circuit 51 to the stator coil 14. Due to this, the rotor 13 and the compression mechanism 11 stop.

Next, at step S108, the control circuit 55 sets a differential pressure flag in memory based on the differential pressure determination information obtained at the above described step S107.

Specifically, when the temperature detected by the temperature sensor 58 is below a temperature Ta, a differential pressure flag N is set in the memory as the differential pressure flag to represent that the refrigerant pressure difference is below a threshold S1.

When the temperature detected by the temperature sensor 58 is equal to above the temperature Ta and below a temperature Tb, a differential pressure flag A is set in the memory as the differential pressure flag to represent that the refrigerant pressure difference is equal to or above the threshold S1 and below a threshold S2. Further, the temperature Tb is greater than the temperature Ta. In addition, the threshold S2 is greater than the threshold S1.

When the temperature detected by the temperature sensor 58 is equal to or above the temperature Tb, a differential pressure flag B is set in the memory as the differential pressure flag to represent that the refrigerant pressure difference is equal or above the threshold S2.

In this manner, the differential pressure flag may be stored in memory based on the temperature of the inverter circuit 51.

Next at step S109, the operation flag is obtained from the electronic control unit 60. Next, at step S110, it is determined whether the measured time t counted by the timer is equal to or above a predetermined time period.

Here, when the measured time t is less than the predetermined time period, NO is determined at step S110. Next, when the operation flag obtained at step S109 described above is an OFF flag, NO is determined at step S111, and the process returns to step S109. For this reason, while the measured time t is less than the predetermined time period and the operation flag is an OFF flag, the operation flag obtaining process (step S109), the NO determination at step S110, and the NO determination at step S111 are repeated.

Further, when the measure time t is less than the predetermined time period and the operation flag obtained at step S109 is an ON flag, NO is determined at step S110, and YES is determined at step S111. In accordance with this, a restart control process is performed at step S120. FIG. 3 is a flowchart showing details of the restart control process of step S120.

During the restart control process, first, the control circuit 55 determines whether the differential pressure flag set in the memory is the differential pressure flag A, the differential pressure flag B, or the differential pressure flag N at step S113 in FIG. 3.

First, at step S113 described above, when the differential pressure flag is determined to be the differential pressure flag N, the refrigerant pressure difference is considered to be below the threshold S1, and a control signal is output to the electronic control unit 60 for starting the operation of the electric fans 21, 41. For this reason, the electronic control unit 60 controls the electric fans 21, 41 and the electric fans 21, 41 to begin to blow air. Accordingly, an airflow of vehicle cabin external air flowing through the condenser 20, and an airflow of vehicle cabin internal air flowing through the evaporator 40 are generated (step S114).

In addition to this, the control circuit 55 performs a restart control for the compression mechanism 11 through a forced commutation control in a startup mode N (step S117).

Specifically, the carrier wave Kn and the voltage command wave VS shown in FIG. 4 used in the PWM control process are set in the drive circuit 53. The carrier wave Kn is a carrier wave with a carrier frequency of fpwm1.

For this reason, the drive circuit 53 compares the voltage command wave VS and the carrier wave Kn in each phase to determine which of the switching elements SW1, SW2, . . . SW6 to turn on, and outputs a control signal including this determined information to the inverter circuit 51.

When such a control signal is sent to the inverter circuit 51, the switching elements SW1, SW2, SW3, SW4, SW5, SW6 are operated to switch. Due to this, a three phase alternating current flows from the common connection points T1, T2, T3 to the stator coil 14.

Accordingly, a rotating magnetic field is generated from the stator coil 14. In accordance with this, the rotor synchronously rotates with the rotating magnetic field. Due to this, the rotation speed of the rotor 13 may be gradually increased to reach the predetermined rotation speed Nc. At this time, the compression mechanism 11 is driven by the rotation force of the rotor 13.

Due to this, the compression mechanism 11 sucks in refrigerant from the refrigerant outlet of the evaporator 40 and compresses this refrigerant, and then discharges high pressure refrigerant. The condenser 20 dissipates heat from the high pressure refrigerant discharged by the compression mechanism 11 into vehicle cabin external air. The pressure reducing valve 30 reduces the pressure of the high pressure refrigerant cooled by the condenser 20. The evaporator 40 cools vehicle cabin internal air with the low pressure refrigerant which was pressure reduced by the pressure reducing valve 30. Then, the control circuit 55 moves to step S103.

Conversely, at step S113 described above, when the differential pressure flag is determined to be the differential pressure flag A, the refrigerant pressure difference is considered to be equal to or above the threshold S1 and below the threshold S2, and the control circuit 55 outputs a control signal to the electronic control unit 60 for starting the operation of the electric fans 21, 41. For this reason, the electronic control unit 60 controls the electric fans 21, 41 and the electric fans 21, 41 begin to blow air. Accordingly, an airflow of vehicle cabin external air flowing through the condenser 20, and an airflow of vehicle cabin internal air flowing through the evaporator 40 are generated (step S115).

In addition to this, the control circuit 55 performs a restart control for the compression mechanism 11 through a forced commutation control in a differential pressure startup mode A (step S118).

Figure 5:
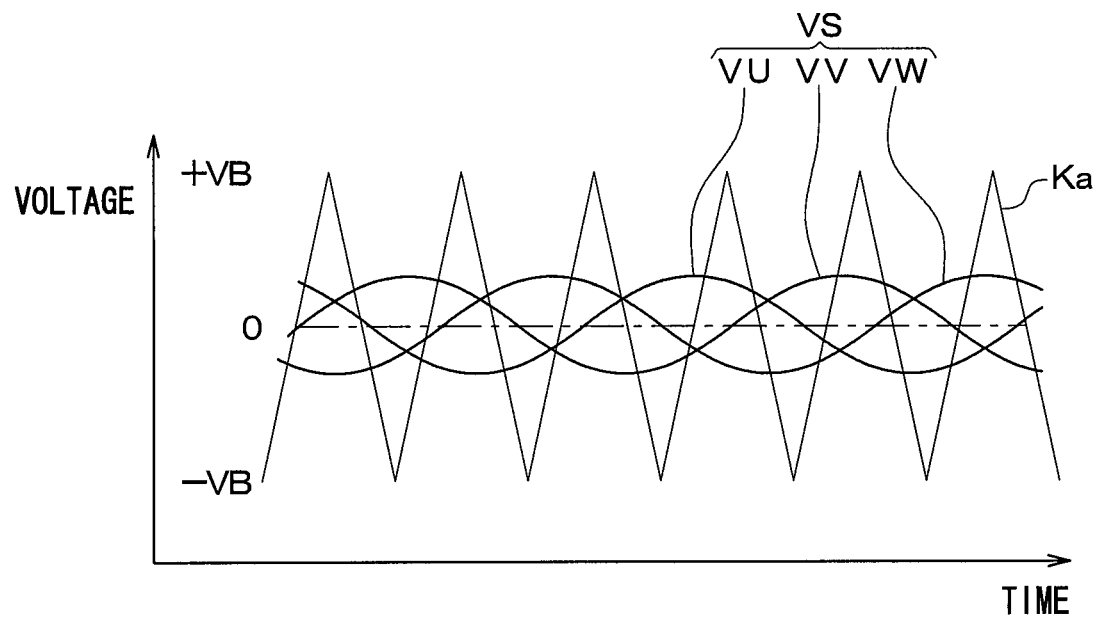
FIG. 5 is a view showing a carrier wave and voltage command waves for each phase used in a drive circuit of FIG. 1.
Figure 7:
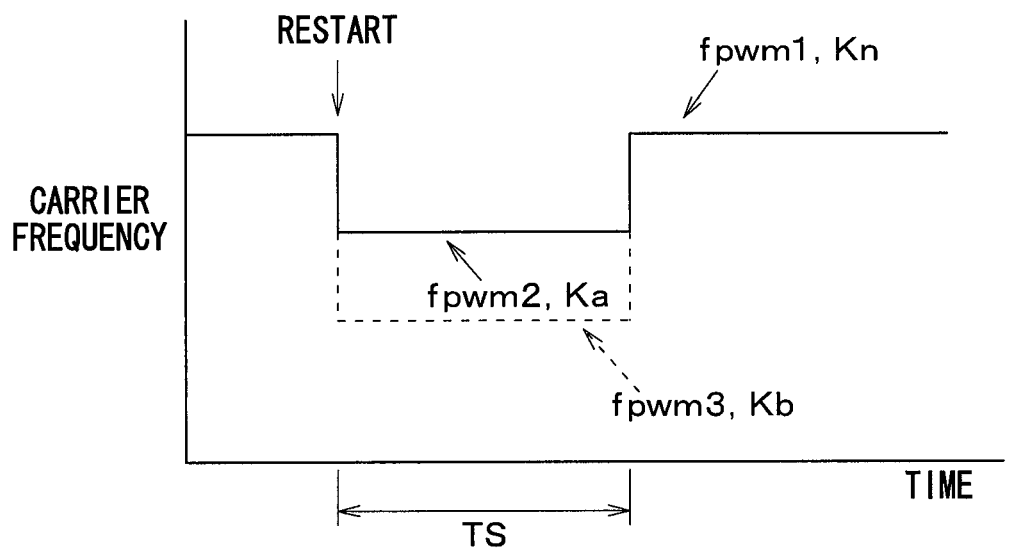
FIG. 7 is a view showing changes in a carrier frequency during restart in the a embodiment.

First, the voltage command wave VS and a carrier wave Ka used during an initial predetermined period TS when the compression mechanism 11 begins to restart are set in the drive circuit 53. Regarding the initial predetermined period TS, an example is shown in FIG. 7, and regarding the carrier wave Ka, an example is shown in FIG. 5. The carrier wave Ka is a carrier wave with a carrier frequency of fpwm2. Here, fpwm2 is a lower carrier frequency than fpwm1.

For this reason, during the initial predetermined period TS when the compression mechanism 11 begins to restart, the drive circuit 53 compares the voltage command wave VS with the carrier wave Ka in each phase. Then, based on the results of this comparison, the drive circuit 53 determines which of the switching elements SW1, SW2, ... SW6 to turn on, and outputs a control signal including this determined information to the inverter circuit 51.

Next, as shown in FIG. 7, after the predetermined period TS elapses, the control circuit 55 sets the carrier wave Kn and the voltage command wave VS in the drive circuit 53.

In this regard, in the differential pressure startup mode A, the drive circuit 53 uses the carrier wave Ka during the initial predetermined period TS when the compression mechanism 11 begins to restart, and the drive circuit 53 uses the carrier wave Kn after the predetermined period TS.

For this reason, after the predetermined period TS, the drive circuit 53 compares the voltage command wave VS and the carrier wave Kn in each phase to determine which of the switching elements SW1, SW2, ... SW6 to turn on, and outputs a control signal including this determined information to the inverter circuit 51.

When such a control signal is output to the inverter circuit 51, the switching elements SW1, SW2, SW3, SW4, SW5, SW6 are operated to switch. Due to this, a three phase alternating current flows from the common connection points T1, T2, T3 to the stator coil 14. Accordingly, a rotating magnetic field is generated from the stator coil 14.

In accordance with this, the rotor 13 synchronously rotates with the rotating magnetic field. Due to this, the rotation speed of the rotor 13 may be gradually increased to reach the predetermined rotation speed Nc. At this time, the compression mechanism 11 is driven by the rotation force of the rotor 13. Due to this, the compression mechanism 11 sucks in and compresses low pressure refrigerant, and then discharges high pressure refrigerant. In accordance with this, the condenser 20, the pressure reducing valve 30, and the evaporator 40 operate similarly as described above. Then, the control circuit 55 moves to step S103.

Conversely, at step S113 described above, when the differential pressure flag is determined to be the differential pressure flag B, the refrigerant pressure difference is considered to be equal to or above the threshold S2, and the control circuit 55 outputs a control signal to the electronic control unit 60 for starting the operation of the electric fans 21, 41. Accordingly, an airflow of vehicle cabin external air flowing through the condenser 20, and an airflow of vehicle cabin internal air flowing through the evaporator 40 are generated (step S115).

In addition to this, the control circuit 55 performs a restart control for the compression mechanism 11 through a forced commutation control in a differential pressure startup mode B (step S119).

Figure 6:
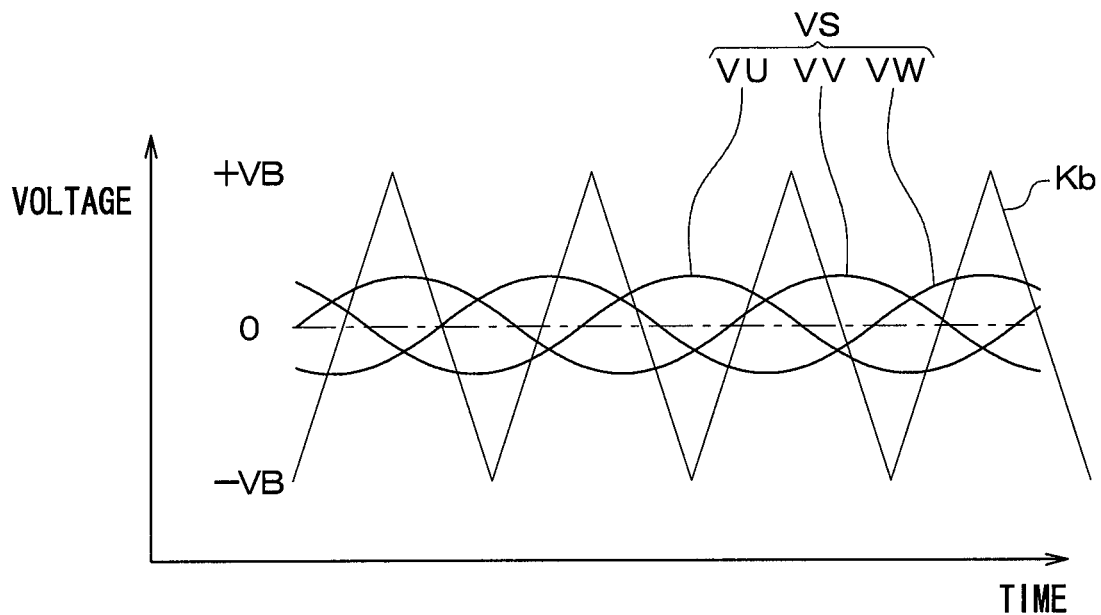
FIG. 6 is a view showing a carrier wave and voltage command waves for each phase used in a drive circuit of FIG. 1.

First, the voltage command wave VS and a carrier wave Kb used during an initial predetermined period TS when the compression mechanism 11 begins to restart are set in the drive circuit 53. An example of the carrier wave Kb is shown in FIG. 6. The carrier wave Kb is a carrier wave with a carrier frequency of fpwm3. Here, fpwm3 is a lower carrier frequency than fpwm2.

For this reason, during the initial predetermined period TS when the compression mechanism 11 begins to restart, the drive circuit 53 compares the voltage command wave VS with the carrier wave Kb in each phase to determine which of the switching elements SW1, SW2, ... SW6 to turn on. Then, the drive circuit 53 outputs a control signal including this determined information to the inverter circuit 51.

Then, after the predetermined period TS elapses, the control circuit 55 sets the carrier wave Kn and the voltage command wave VS in the drive circuit 53.

For this reason, the drive circuit 53 compares the voltage command wave VS and the carrier wave Kn in each phase to determine which of the switching elements SW1, SW2, ... SW6 to turn on, and outputs a control signal including this determined information to the inverter circuit 51.

In this regard, in the differential pressure startup mode B, the drive circuit 53 uses the carrier wave Kb during the initial predetermined period TS when the compression mechanism 11 begins to restart, and the drive circuit 53 uses the carrier wave Kn after the predetermined period TS.

Here, the differential pressure startup mode B and the differential pressure startup mode A are only different in the carrier frequency used by the drive circuit 53 during the predetermined period TS, and other operations are the same. For this reason, explanations of the restart control of the compression mechanism 11 during the differential pressure startup B are simplified.

In the present embodiment, in the differential pressure startup mode A or the differential pressure startup mode B, prior to performing the restart controls for the compression mechanism 11 at steps S118, S119, the electric fans 21, 41 are operated.

Here, when the carrier frequencies fpwm2, fpwm3 are within a range of human audible frequencies, as the switching elements SW1, SW2, ... SW6 are operated to switch, unpleasant or damaging vibration sounds may be generated in the inverter circuit 51. These vibration sounds are generated due to the carrier frequencies fpwm2, fpwm3.

Here, in the present embodiment, when performing the restart control for the compression mechanism 11 at steps S118, S119, the electric fans 21, 41 are controlled to blow air due to the blow air control process at step S115 described above. At this time, fan wind sounds and electric motor rotation sounds are generated from the electric fans 21, 41. These sounds generated from the electric fans 21, 41 are used to mask the vibration sounds generated from the inverter circuit 51 and the stator coil 14 of the electric compressor 10. Accordingly, it is possible to prevent a passenger or the like from feeling discomfort due to unpleasant vibration sounds generated from the inverter circuit 51.

Further, after the control circuit 55 determines NO at step S105, if the control circuit 55 then repeatedly determines NO at step S111 in FIG. 2, the measured time t increases. In this case, refrigerant flows through gaps in the compression mechanism 11 or pressure reducing valve 30 due to the refrigerant pressure difference between the refrigerant inlet and refrigerant outlet. Accordingly, the refrigerant pressure difference decreases.

For this reason, after the control circuit 55 repeatedly determines NO at step S111, after the measured time t reaches or exceeds the predetermined time period, the control circuit 55 determines YES at step S110.

In this case, the control circuit 55 resets the differential pressure flag set in the memory and the measured time t by the timer (step S112). Accordingly, the differential pressure determination information stored in the memory and the measured time t are discarded.

After that, the process returns to step S100. Accordingly, the operation flag is obtained at step S100, and when this operation flag is an ON flag, YES is determined at step S101, and the startup control of step S102 is performed. For this reason, the drive circuit 53 uses the carrier wave Kn with a carrier frequency of fpwm1 in the PWM control process. Then, steps S103 ... S112, S113, S119, S100, S101, S102 are repeated.

By performing the compressor control process in this manner, once the measure time t is equal to or above the predetermined time period, the control circuit 55 discards the differential pressure determination information stored in the memory and the measured time t (step S112). Further, if the measured time t is less than the predetermined time period, and YES is determined at step S111, the control circuit 55 performs the restart control process at step S120.

According to the present embodiment described above, the drive device 50 includes the inverter circuit 51. The inverter circuit 51 includes the switching elements SW1, SW2, ... SW6 which are arranged in series pairs for each phase, the plurality of pairs of switching elements are arranged in parallel between the positive bus 51a and the negative bus 51b. When the voltage command wave VS of each phase, whose voltage periodically changes, exceeds the carrier wave, whose voltage periodically changes, the drive circuit 53 turns on the switching element toward the positive bus and turns off the switching element toward the negative bus for the pair of switching elements of each phase. Further, when the voltage command wave VS of each phase is smaller than the carrier wave, the drive circuit 53 turns on the switching element toward the negative bus and turns off the switching element toward the positive bus. Due to the drive circuit 53 turning on and off the pair of switching elements in each phase, a three phase alternating current flows from the inverter circuit 51 to the stator coil 14 based on the output voltage of the high voltage source 70, and a rotation magnetic field is generated from the stator coil 14.

The control circuit 55 controls the inverter circuit 51 through the drive circuit 53 such that a three phase alternating current flows from the inverter circuit 51 to the stator coil 14 to increase the rotation speed of the rotor 13 during the startup of the compression mechanism 11 until reaching the predetermined rotation speed Nc.

Here, when a large amount of electric power is used by machines other than the electric compressor 10, such as a motor for propulsion, the electric compressor 10 may be stopped. Alternatively, due to an operation by a passenger, accidentally or otherwise, the electric compressor 10 may be stopped due to manual operation of the air conditioning switch 61.

For this reason, as conditions for restarting the electric compressor 10, there may occasionally be severe conditions. For example, there may be a condition where the electric compressor 10 is driven at maximum output, and after suddenly stopping, the electronic control unit 60 requests an immediate restart. Here, the electric compressor 10 being operated at maximum output refers to an environment condition where high air conditioning capabilities are needed as a vehicle air conditioning device, and the electric compressor 10 is requested to restart as quickly as possible. For this reason, there may be cases where the electric compressor 10 must be restarted while a high refrigerant pressure difference exists.

Here, after the compressor mechanism 11 stops, the control circuit 55 controls the drive circuit 53 and determines whether the refrigerant pressure difference when restarting the compression mechanism 11 is equal to above the threshold S1. When the control circuit 55 determines that the refrigerant pressure difference is equal to or above the threshold S1, the control circuit 55 is characterized by setting the carrier wave used by the drive circuit 53 during the initial predetermined period when the compression mechanism 11 begins to restart to be lower as compared to when the control circuit 55 determines that the refrigerant pressure difference is less than the threshold S1.

Due to the above, when the refrigerant pressure difference is equal to or above the threshold S1, as compared to when the refrigerant pressure difference is less than the threshold S1, the number of times that the switching elements SW1 ... SW6 are switched per unit time may be reduced during the initial predetermined period TS when the restart begins. The number of times of switching here refers to, among the switching elements SW1 ... SW6, the number of times of changing from one of an on and off state to the other state. Accordingly, when restarting the compression mechanism 11 and the refrigerant pressure difference is equal to or above the threshold S1, loss may be reduced in the switching elements SW1 ... SW6, the capacitors 52, 71, and the coil 72. Due to this, when restarting with a high refrigerant pressure difference, as shown in FIG. 8, heat generated by the inverter circuit 51 and the like may be reduced.

In the present embodiment, the control circuit 55 uses a carrier frequency of fpwm1 (for example, 20 kHz) when the refrigerant pressure difference is less than the threshold S1. Further, the control circuit 55 uses a carrier frequency of fpwm2 (for example, 10 kHz) when the refrigerant pressure difference is equal to or above the threshold S1 and less than the threshold S2. Further, the control circuit 55 uses a carrier frequency of fpwm3 (for example, 5 kHz) when the refrigerant pressure difference is equal to or greater than the threshold S2.

Figure 9:
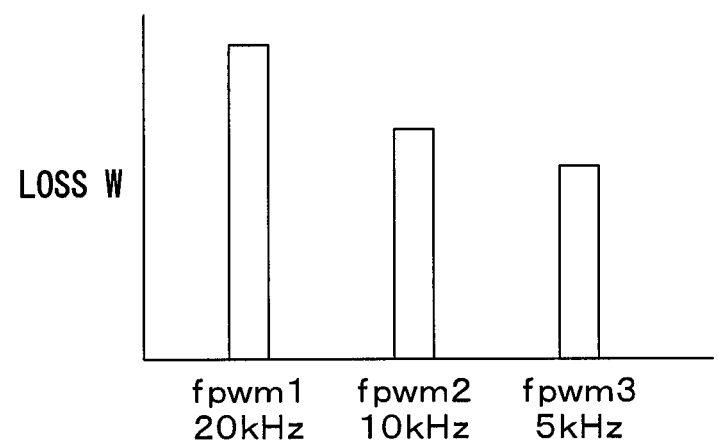
FIG. 9 is a histogram that shows a relationship between carrier frequency and loss in a first embodiment.

Here, a loss W in the switching elements SW1, SW2, ... SW6 is, as shown in FIG. 9, reduced as the carrier frequency decreases. For this reason, the greater that the refrigerant pressure difference is, the more the loss W may be reduced. Accordingly, when the refrigerant pressure difference is equal to or above the second threshold S2, by increasing the margin by which the carrier frequency is reduced, the loss W may be even further reduced.

Figure 8:
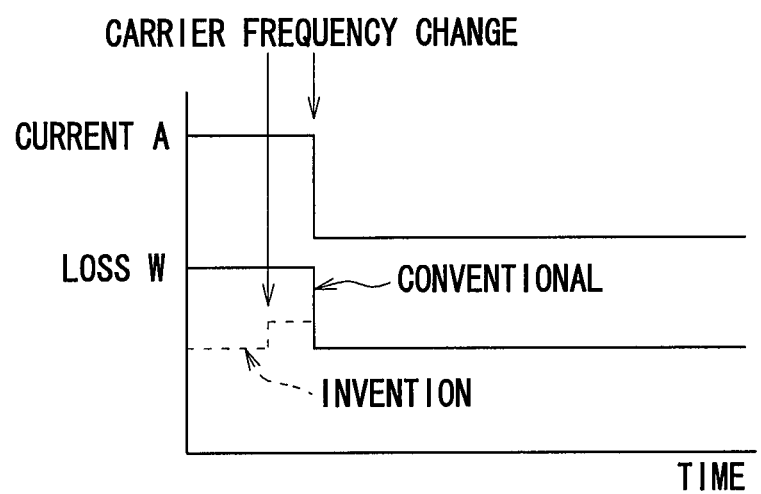
FIG. 8 is a schematic view showing a decrease in losses according to changes in a carrier frequency during restart in a first embodiment.

In this regard, according to the present embodiment and as shown in FIG. 8, the control circuit 55 changes the carrier frequency, but does not change the current value for driving the electric compressor 10. Accordingly, even if the refrigerant pressure difference is equal to or above the threshold S1, there is no problem of an insufficient output from the synchronous motor 12 to the compressor mechanism 11 or the like, and the restart of the compression mechanism 11 is not impeded.

Due to this effects, when performing the differential pressure startup mode A, B of the electric compressor 10, even without addressing heat or increasing the restart current or the like, and also without increasing the physical size thereof, the compression mechanism 11 may be quickly restarted.

In the present embodiment, when the control circuit 55 repeatedly obtains an OFF flag as the operation flag from the electronic control unit 60, and the measured time which elapsed from after performing the stop control process in step S106 described above becomes equal to or above the predetermined time period, the differential pressure flag set in the memory is reset. For this reason, if the actual refrigerant pressure difference becomes small, it is possible to prevent the compression mechanism 11 from being started up in the differential pressure startup mode A or the differential pressure startup mode B.

Second Embodiment

In the first embodiment described above, an example is described in which the carrier frequency used by the drive circuit 53 during restart is set based on refrigerant pressure difference, and as an alternative, the following is contemplated.

In other words, in the present second embodiment, the carrier frequency used by the drive circuit 53 during restart is set based on refrigerant pressure difference, and the initial predetermined period, during which the set carrier frequency is used in the drive circuit 53, is set based on the refrigerant pressure difference.

Figure 10:
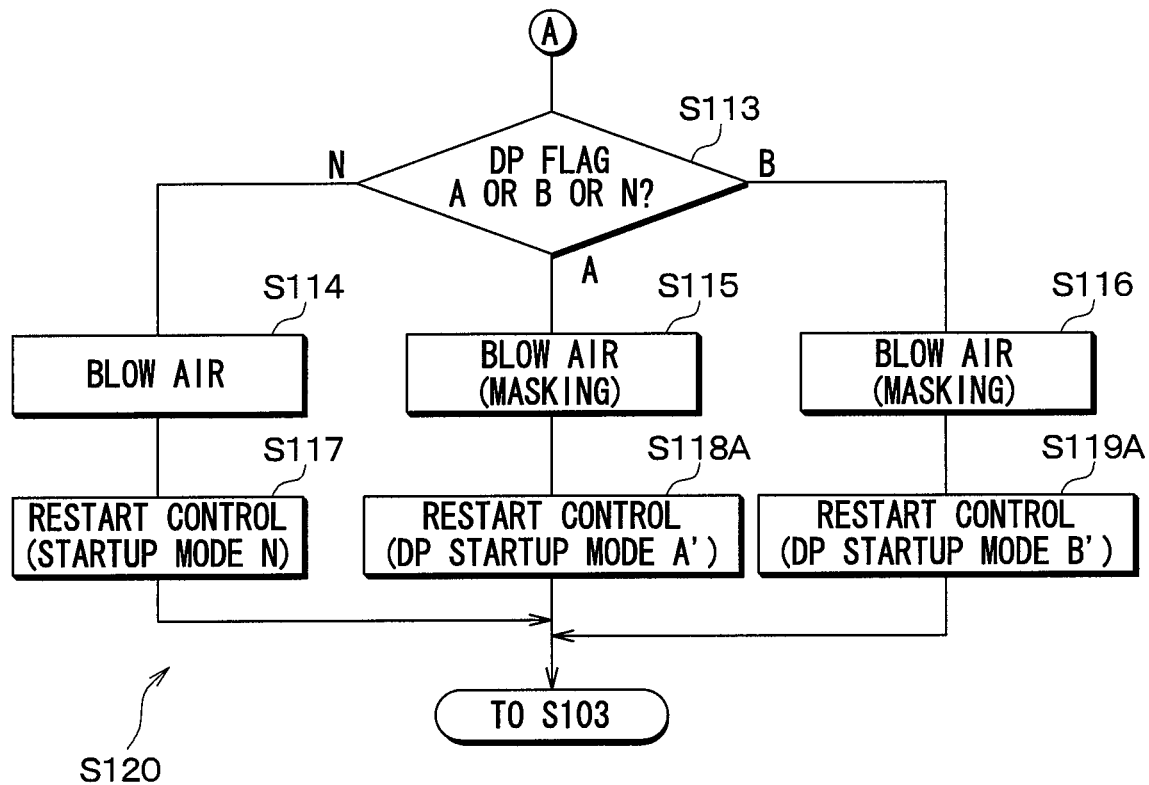
FIG. 10 is a flowchart showing details of a restart control process in a second embodiment.

FIG. 10 is a flowchart that shows details of the restart control process of step S120 in a compressor control process of the second embodiment. The flowchart of FIG. 10 is used instead of the flowchart of FIG. 3. In FIGS. 3 and 10, the same processing is performed at the steps denoted with the same reference numerals. Step S118A in FIG. 10 is used in place of step S118 in FIG. 3. Step S119A in FIG. 10 is used in place of step S119 in FIG. 3.

At step S113, when it is determined that the differential pressure flag is the differential pressure flag B, the control circuit 55 passes through step S116 and continues to step S119, and restarts in a differential pressure startup mode B'.

At this time, the control circuit 55 sets the voltage command VS and the carrier wave Ka in the drive circuit 53 for use during the initial predetermined period when the restart begins, and also sets an initial predetermined period TSb in the drive circuit 53 as the initial predetermined period during which the carrier wave Ka is used.

Figure 11:
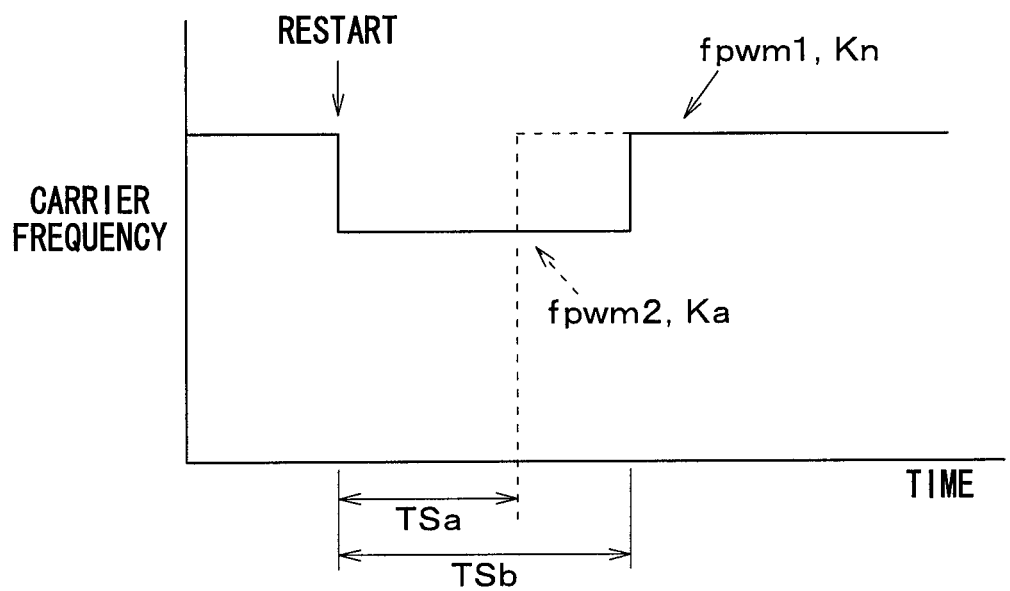
FIG. 11 is a view showing changes in a carrier frequency during restart in a second embodiment.

For this reason, as shown in FIG. 11, during the initial predetermined period TSb, the drive circuit 53 compares the voltage command wave VS with the carrier wave Ka rather than the carrier wave Kb to determine which of the switching elements SW1, SW2, . . . SW6 to turn on.

Then, after the initial predetermined period TSb, the control circuit 55 sets the voltage command wave VS and the carrier wave Kn in the drive circuit 53.

Accordingly, the drive circuit 53 compares the voltage command wave VS and the carrier wave Kn in each phase to determine which of the switching elements SW1, SW2, . . . SW6 to turn on.

In step S113, when the differential pressure flag is determined to be the differential pressure flag A, the control circuit 55 passes through step S115 and continues to step S118A, and restarts in the differential pressure startup mode A'.

At this time, the control circuit 55 sets the voltage command VS and the carrier wave Ka in the drive circuit 53 for use during the initial predetermined period when the restart begins, and also sets the predetermined period TSa shown in FIG. 11 in the drive circuit 53 as the initial predetermined period during which the carrier wave Ka is used.

For this reason, during the initial predetermined period TSa, the drive circuit 53 compares the voltage command wave VS with the carrier wave Ka to determine which of the switching elements SW1, SW2, . . . SW6 to turn on. Then, after the initial predetermined period TSa, the control circuit 55 sets the voltage command wave VS and the carrier wave Kn in the drive circuit 53.

Accordingly, the drive circuit 53 compares the voltage command wave VS and the carrier wave Kn in each phase to determine which of the switching elements SW1, SW2, . . . SW6 to turn on.

In this regard, when the differential pressure flag is determined to be the differential pressure flag A, the control circuit 55 sets the predetermined period TSa as the predetermined period during which the carrier wave Ka is used. Further, when the differential pressure flag is determined to be the differential pressure flag B, the control circuit 55 sets the predetermined period TSb as the predetermined period during which the carrier wave Ka is used.

Here, as shown in FIG. 11, the predetermined period TSa is set to be shorter than the predetermined period TSb. For this reason, when the differential pressure flag is determined to be the differential pressure flag B, the predetermined period during which the carrier wave Ka is used is longer as compared to when the differential pressure flag is determined to be the differential pressure flag A. For this reason, as the refrigerant pressure difference increases, the time period during which the carrier wave Ka is used also increases. Accordingly, as the refrigerant pressure difference increases, the amount of time during which the loss W is reduced may be increased.

Third Embodiment

In the first embodiment described above, an example is provided in which the differential pressure determination information is obtained when performing the normal control process, but instead of this, a third embodiment where the differential pressure determination information is obtained during the restart control process will be explained.

Figure 12:
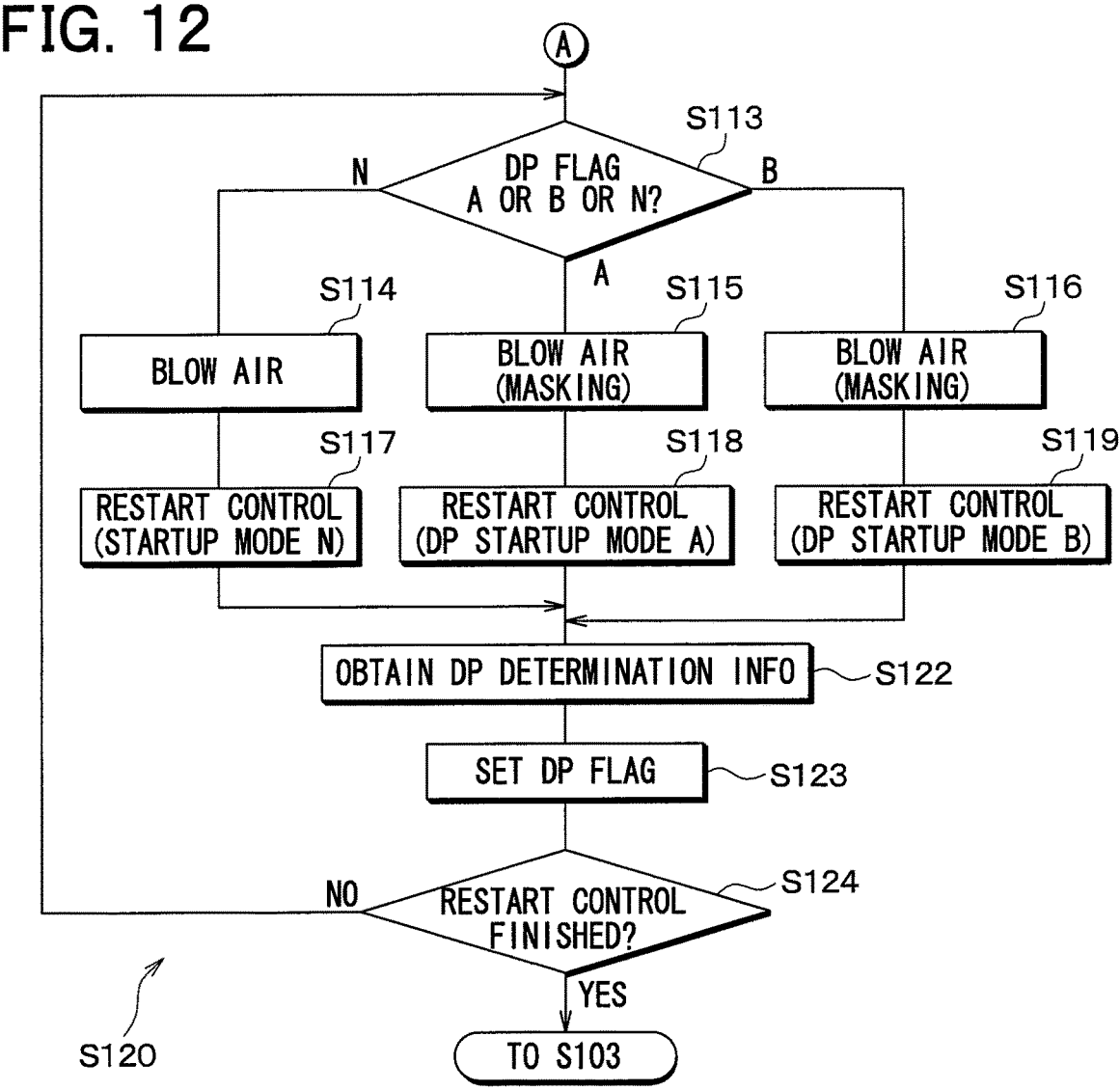
FIG. 12 is a flowchart showing details of a restart control process in a third embodiment.

FIG. 12 is a flowchart showing the details of the restart control process of step S120 in a compressor control process of the third embodiment. The flowchart of FIG. 12 is used instead of the flowchart of FIG. 3. In FIGS. 3 and 12, the same processing is performed at the steps denoted with the same reference numerals. FIG. 12 is equivalent to FIG. 3 with steps S122, S123, S124 added.

According to the present embodiment, after performing any of the restart control processes at steps S117, S118, S119, the control circuit 55 obtains the differential pressure determination information which represents the refrigerant pressure difference at step S122. As the differential pressure determination information in present embodiment, the three phase alternating current detected by the current sensor 57 is used as the differential pressure determination information.

When performing the restart control process, the magnitude of the three phase alternating current flowing from the inverter circuit 51 to the stator coil 14 is controlled by the predetermined current value capable of starting the rotation of the rotor 13. Further, the phase of the three phase alternating current changes according to the torque output from the rotor 13.

The torque and the refrigerant pressure difference have a correlated relationship. For this reason, the torque may be calculated from the three phase alternating current. And then, the refrigerant pressure difference may be calculated from the three phase alternating current detected by the current sensor 57. Then, at step S123, similar to step S108 described above, the differential pressure flag is set in the memory based on the differential pressure determination information obtained at step S122 described above.

Here, prior to performing the restart control of the compression mechanism 11 in the differential pressure startup mode A at step S118 or the differential pressure startup mode B at step S119, the control circuit 55 controls the electric fans 21, 41 to blow air at step S115 or step S116.

At this time, the electric fan 21 generates an airflow of vehicle cabin external air passing through the condenser 20. In the condenser 20, heat transfers from the high pressure refrigerant to the vehicle cabin external air. For this reason, the pressure of the high pressure refrigerant at the refrigerant discharge side of the compression mechanism 11 decreases.

The electric fan 41 generates an airflow of vehicle cabin internal air passing through the evaporator 40. In the evaporator 40, heat transfers from the vehicle cabin internal air to the low pressure refrigerant. For this reason, the pressure of the low pressure refrigerant at the refrigerant intake side of the compression mechanism 11 decreases. Due to this, the refrigerant pressure difference decreases.

Further, since the control circuit 55 controls the pressure reducing valve 30 through the electronic control unit 60, the cross section area of the refrigerant passage between the refrigerant outlet of the condenser 20 and the refrigerant inlet of the evaporator 40 is set to be large. In other words, by increasing the opening degree of the pressure reducing valve 30, the refrigerant pressure difference may be further reduced.

Next, at step S124, it is determined where the restart control is completed or not. Specifically, the actual rotation speed Na of the rotor 13 is calculated based on the detection value of the voltage sensor 56 and the detection value of the current sensor 57. Then, it is determined whether this actual rotation speed Na has reached the predetermined rotation speed Nc or not. When it is determined that the actual rotation speed Na is less than the predetermined rotation speed Nc, NO is determined at step S124 meaning that the restart control is not completed. In accordance with this, the process returns to step S113. For this reason, while the actual rotation speed Na is under the predetermined rotation speed Nc, steps S113 to S119, S122, S123, and the NO determination at step S124 are repeated. For this reason, while the actual rotation speed Na is under the predetermined rotation speed Nc, the differential pressure determination information is repeatedly obtained, and for each time it is obtained, the differential pressure flag set in the memory is updated.

For example, when performing step S113 for the first time after beginning the restart, if the differential pressure flag set in the memory is determined to be the differential pressure flag B, after passing through step S116, a restart control of the rotor 13 is performed in the differential pressure startup mode B (step S119).

Then, when performing step S113 for an N-th time which is later than the first time, if the differential pressure flag set in the memory is determined to be the differential pressure flag A, after passing through step S115, a restart control of the rotor 13 is performed in the differential pressure startup mode A (step S118).

Then, when performing step S113 for an M-th time which is later than the N-th time, if the differential pressure flag set in the memory is determined to be the differential pressure flag N, after passing through step S114, a restart control of the rotor 13 is performed in the differential pressure startup mode N (step S117).

Figure 13:
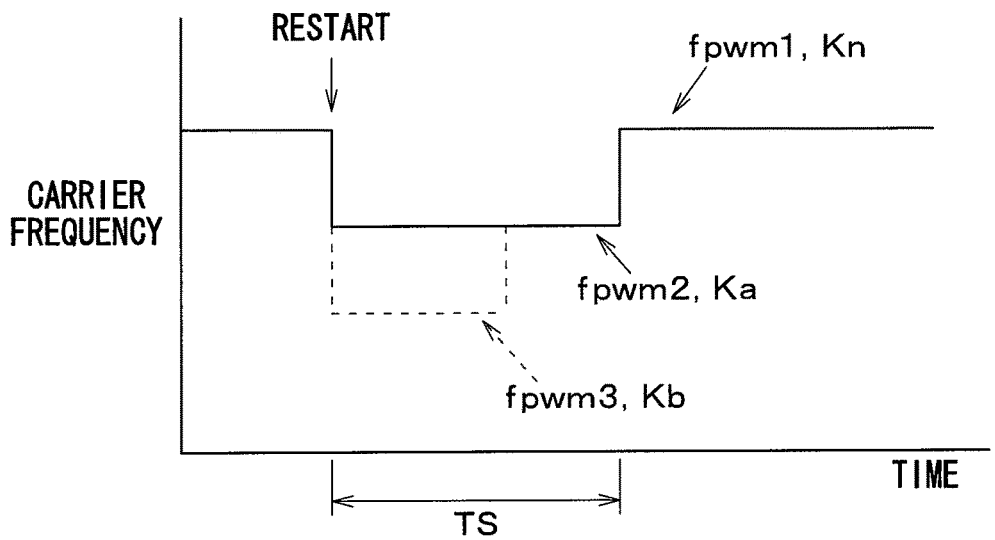
FIG. 13 is a view showing changes in a carrier frequency during restart in a third embodiment.

In this regard, due to the differential pressure flag sequentially changing from the differential pressure flag B, to the differential pressure flag A, then to the differential pressure flag N, the carrier frequency sequentially changes from fpwm3, to fpwm2, then to fpwm1 as shown in FIG. 13.

Then, when the actual rotation speed Na reaches the predetermined rotation speed Nc, YES is determined at step S124 meaning that the restart control has completed. In accordance with this, the process continues to step S103.

According to the present embodiment described above, the differential pressure determination information is repeatedly obtained while performing the restart control process, and each time the differential pressure determination information is obtained, the differential pressure flag set in the memory is updated. For this reason, the carrier frequency used by the drive circuit 53 may be updated in accordance with changes in the refrigerant pressure difference.

According to the present embodiment, due to the electric fans 21, 41 blowing air, the refrigerant pressure difference decreases. Further, the opening degree of the pressure reducing valve 30 is increased and the refrigerant pressure difference further decreases. For this reason, the torque output from the rotor 13 to the compression mechanism 11 may be reduced. Accordingly, the amount of heat generated from the inverter circuit 51 may be reduced.

Fourth Embodiment

In the first embodiment described above, an example is provided in which the differential pressure determination information is obtained when performing the normal control of step S103, but instead of this, a fourth embodiment where the differential pressure determination information is obtained during the stop control of step S106 will be explained.

Figure 14:
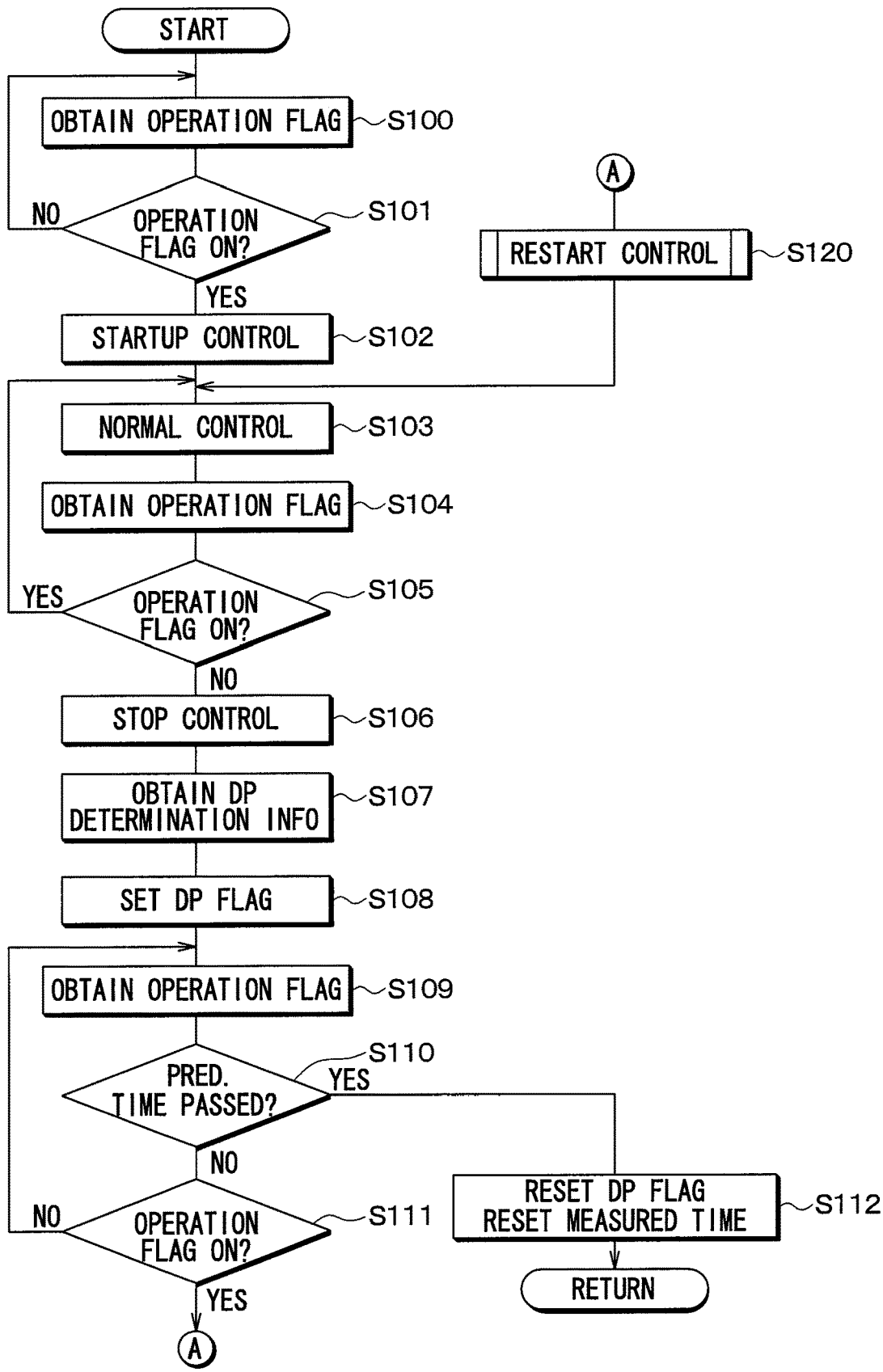
FIG. 14 is a flowchart showing a compressor control process of a control circuit of a fourth embodiment.

FIG. 14 is a flowchart showing a compressor control process of the fourth embodiment. In FIGS. 14 and 2, the same processing is performed at the steps denoted with the same reference numerals. In the flowchart of FIG. 14, step S107 is placed between step S106, S108. In the present embodiment, when performing the stop control of the rotor 13 at step S106, the control circuit 55 obtains the differential pressure determination information at step S107. In the present embodiment, the temperature of the inverter circuit 51 detected by the temperature sensor 58 is used as the differential pressure determination information.

Here, the detection temperature of the temperature sensor 58 is determined by the heat generated from the inverter circuit 51 etc. when NO is determined at step S105. The detection temperature of the temperature sensor 58 changes according the three phase alternating current flowing from the inverter circuit 51 to the stator coil 14 due to the normal control at step S103, immediately prior to performing the stop control of step S106. Accordingly, the detection temperature of the temperature sensor 58 is correlated with the torque immediately prior to performing the stop control of step S106. Further, there is a correlation between the torque immediately prior to performing the stop control of step S106 and the refrigerant pressure difference immediately prior to performing the stop control of step S106. For this reason, the refrigerant pressure difference may be estimated from the detection temperature of the temperature sensor 58.

Fifth Embodiment

Figure 15:
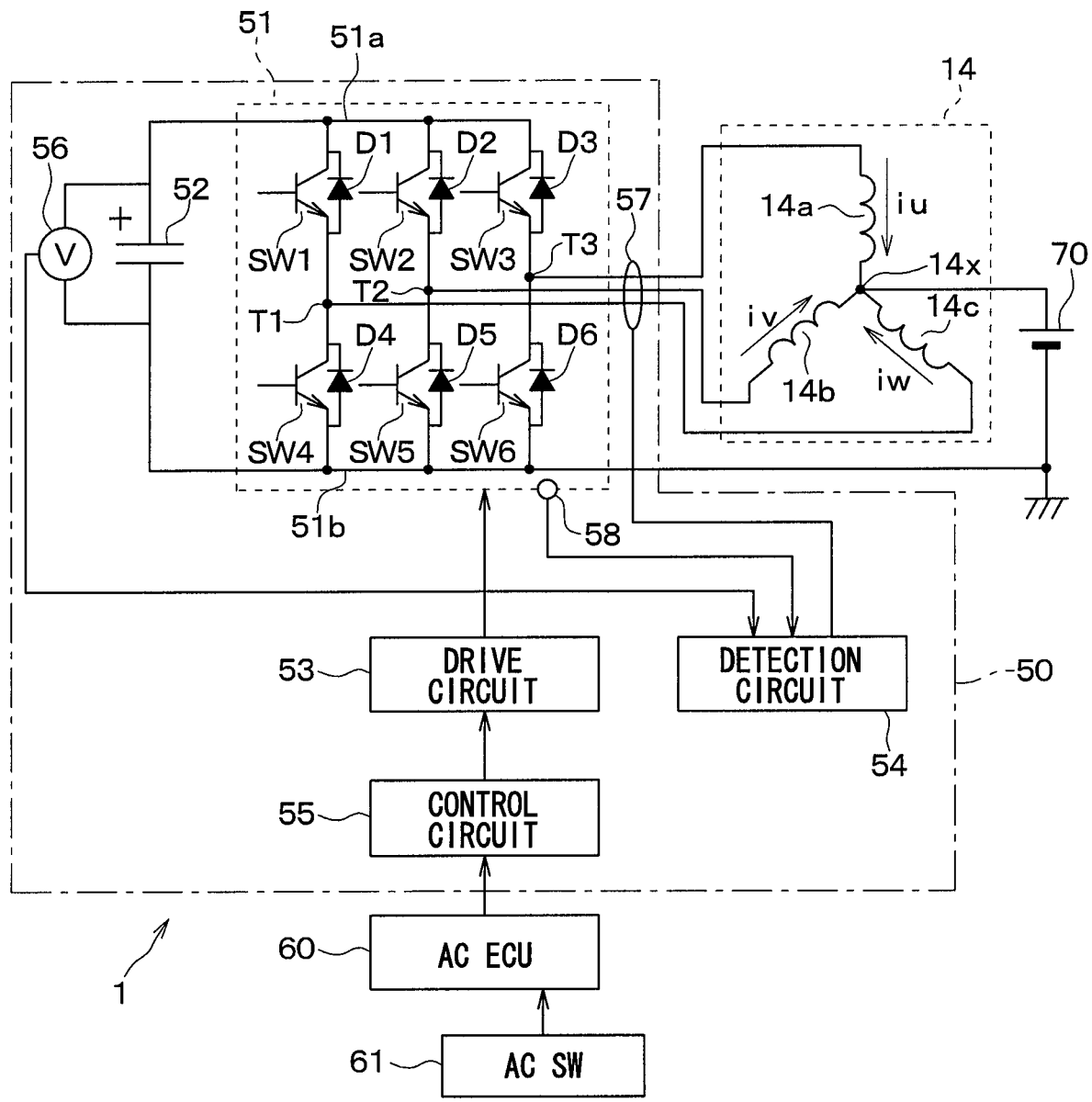
FIG. 15 is a view showing an electrical configuration of a drive device according to a fifth embodiment.

In the first through fourth embodiments described above, examples are described where the high voltage source 70 is connected between the positive bus 51*a* and the negative bus 51*b*, but instead of this, as shown in FIG. 15, the high voltage source 70 may be connected between the neutral point 14*x* of the stator coil 14 and the negative bus 51*b*.

FIG. 15 shows the electrical configuration of a drive device 50 according to the fifth embodiment. In FIGS. 15 and 1, elements which are the same as each other are denoted with the same reference numerals, and explanations thereof are omitted for brevity. The neutral point 14*x* of the stator coil 14 of the present embodiment is connected to ground through the high voltage source 70.

In the fifth embodiment described above, an example is described where the capacitor 52 is connected between the positive bus 51*a* and the negative bus 51*b*, but instead of this, the capacitor 52 may be connected between the neutral point 14*x* of the stator coil 14 and the positive bus 51*a* instead.

Sixth Embodiment

In the fifth embodiment described above, an example is described where the high voltage source 70 is connected between the neutral point 14*x* of the stator coil 14 and the negative bus 51*b*. However, instead of this, the high voltage source 70 may be connected between the neutral point 14*x* of the stator coil 14 and the positive bus 51*a*.

Figure 16:
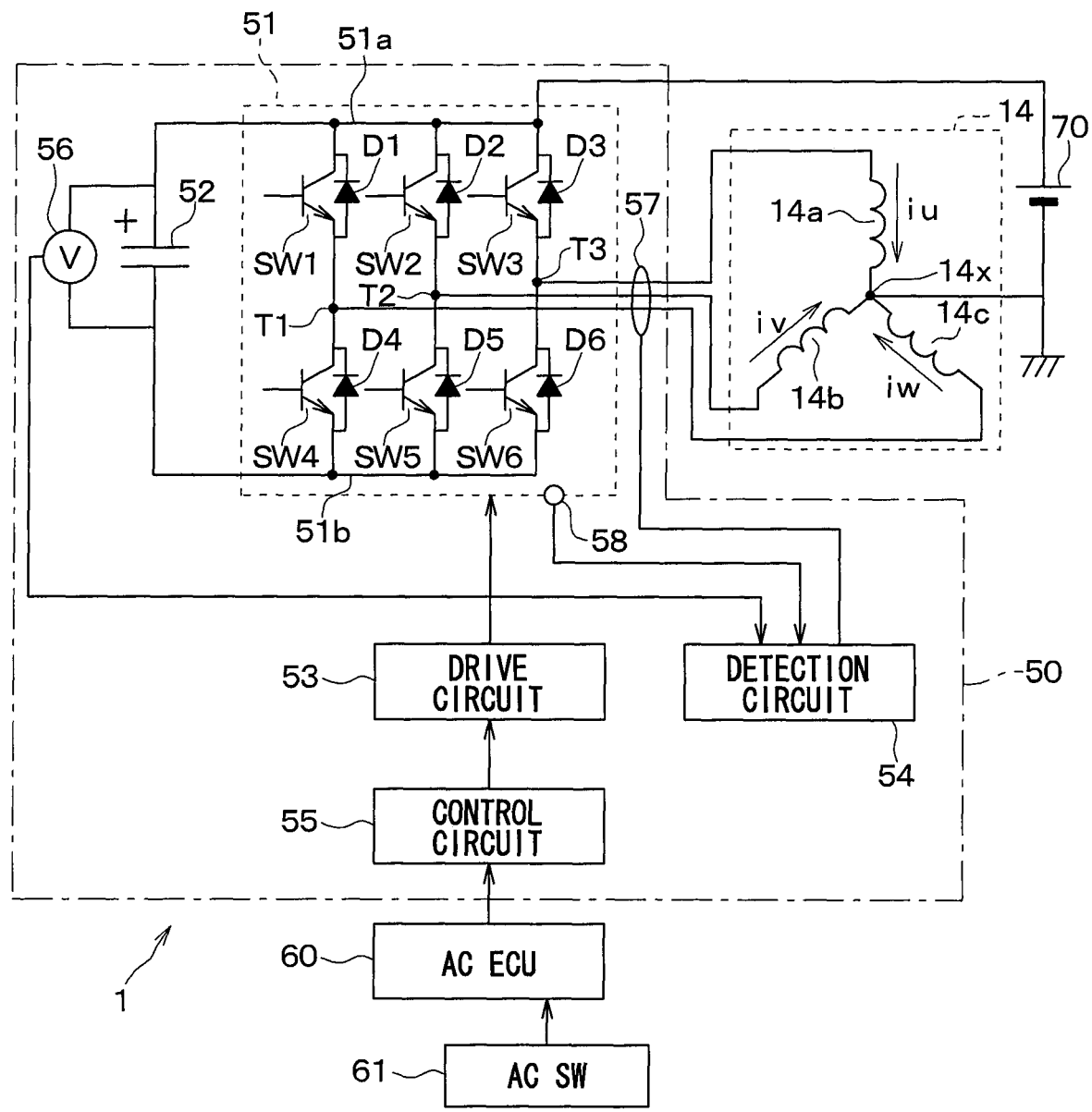
FIG. 16 is a view showing an electrical configuration of a drive device according to a sixth embodiment.

FIG. 16 shows the electrical configuration of a drive device 50 according to the sixth embodiment. In FIGS. 16 and 1, elements which are the same as each other are denoted with the same reference numerals, and explanations thereof are omitted for brevity. The neutral point 14*x* of the stator coil 14 of the present embodiment is connected to ground.

In the sixth embodiment described above, an example is described where the capacitor 52 is connected between the positive bus 51*a* and the negative bus 51*b*, but instead of this, the capacitor 52 may be connected between the neutral point 14*x* of the stator coil 14 and the negative bus 51*b* instead.

Other Embodiments (1) In the first embodiment described above, an example is described where the temperature of the inverter circuit 51 is used as the differential pressure determination information in step S107, but instead of this, the following (a), (b), (c) are contemplated.

(a) The detection value of the current sensor 57 which detects the three phase alternating current flowing from the inverter circuit 51 to the stator coil 14 may be used as the differential pressure determination information.

Here, there is a correlation between the torque and the refrigerant pressure difference. Further, the three phase alternating current and the torque are correlated. For this reason, the refrigerant pressure difference may be estimated from the three phase alternating current detected by the current sensor 57.

(b) The current command value Is may be used as the differential pressure determination information.

During the normal control process of step S103, three phase alternating current is flowed from the inverter circuit 51 to the stator coil 14 so that the three phase alternating current detected by the current sensor 57 approaches the current command value Is. For this reason, the three phase alternating current detected by the current sensor 57 approaches the current command value Is. Accordingly, the current command value Is may be obtained as a value close to the three phase alternating current flowing from the inverter circuit 51 to the stator coil 14. Due to this, the refrigerant pressure difference may be estimated from the current command value Is.

In this manner, the refrigerant pressure difference may be estimated from the three phase alternating current or the current command value Is, and the differential pressure flag is set based on the estimated refrigerant pressure difference.

(c) An average refrigerant pressure difference value of three of more chosen from the group of the refrigerant pressure difference obtained at (a) described above, the refrigerant pressure difference obtained at (b) described above, and the refrigerant pressure difference obtained from the temperature of the inverter circuit 51 may be used as the differential pressure determination information of step S107.

(2) In the third embodiment described above, an example is described where as the differential pressure determination information at step S122, the control circuit 55 uses the three phase alternating current flowing from the inverter circuit 51 to the stator coil 14 as the differential pressure determination information. However, instead of this, the temperature of the inverter circuit 51 detected by the temperature sensor 58 may be used as the differential pressure determination information.

Here, the heat generated from the inverter circuit 51 when performing the restart control process changes according to the three phase alternating current flowing from the inverter circuit 51 to the stator coil 14. Accordingly, the torque and the heat generated from the inverter circuit 51 are correlated with each other. Further, there is a correlation between the torque and the refrigerant pressure difference. Accordingly, the refrigerant pressure difference may be estimated from the temperature of the inverter circuit 51.

(3) In each embodiment described above, examples are described where the electric compressor 10 is applied to the refrigeration cycle device 1, but instead of this, the electric compressor 10 may be applied to devices other the refrigeration cycle device 1.

(4) In each embodiment described above, examples are described where the carrier wave is a triangle wave that periodically changes from a reference voltage toward a positive side and a negative side. However, instead of this, sawtooth waves other than a triangle wave may be used, as long as the sawtooth wave periodically changes from a reference voltage toward a positive side and a negative side.

(5) In each embodiment described above, examples are described where a three phase alternating current synchronous motor is used as a multiphase alternating current synchronous motor, but this is not intended to be limiting, and a two phase, or four or more phase alternating current synchronous motor may be used as used as a multiphase alternating current synchronous motor.

(6) In each embodiment described above, examples are described where when restarting, the carrier frequency is determined based on the refrigerant pressure difference. However, instead of this, when restarting, the control circuit 55 may determine a magnitude of a startup current as the three phase alternating current flowing from the inverter circuit 51 to the stator coil 14 based on the refrigerant pressure difference.

For example, the startup current may be set such that the startup current is higher as the refrigerant pressure difference is higher, and the startup current is lower as the refrigerant pressure difference is lower. Due to this, even when the refrigerant pressure difference is low during restart, the amount of heat generated from the switching elements SW1, SW2, SW3, SW4, SW5, SW6 may be reduced.

(7) In each embodiment described above, examples are described where the stator coil 14 is wired in a star connection in the synchronous motor 12, but instead of this, the stator coil 14 may be wired in a delta connection instead.

(8) In each embodiment described above, examples are described where the control circuit 55 performs the determinations at steps S101, S105, S111 using the ON flag or the OFF flag provided from the electronic control unit 60. However, instead of this, the control circuit 55 may perform the determinations at steps S101, S105, S111 using the rotation speed command value Nm as well.

(9) In each embodiment described above, examples are described where the restart control is performed using the two differential pressure startup modes A, B or the two differential pressure startup modes A, B, but instead of this, the restart control may be performed using a single differential pressure startup mode as well.

For example, the control circuit 55 may perform the restart control in the startup mode N at step S117 when the refrigerant pressure difference is less than the threshold S1, and perform the restart control in the differential pressure startup mode A at step S118 when the refrigerant pressure difference is equal to or above the threshold S1.

(10) In each embodiment described above, examples are described where each of the electric fans 41, 21 is operated at the air blow process of steps S115, S116, but instead of this, the control circuit 55 may operate only either one of the electric fans 41, 21 at the air blow process of steps S115, S116.

(11) In each embodiment described above, examples are described where a PWM control process is performed by the drive circuit 53, but instead of this, the control circuit 55 may perform the PWM control process as well.

(12) In each embodiment described above, examples are described where the number of times that the switching elements SW1 . . . SW6 are switched per unit time is changed by changing the carrier frequency. However, this is not intended to be limiting, and the control circuit 55 may change the number of times that the switching elements SW1 . . . SW6 are switched per unit time without changing the carrier frequency. In other words, the control circuit may change the number of times that the switching elements SW1 . . . SW6 are switched per unit time using a control other than a PWM control process.

(13) In each embodiment described above, examples are described where the vibration sounds generated from the inverter circuit 51 are masked by the operation sounds generated from the electric fans 21, 41. However, instead of this, the control circuit 55 may mask the vibration sounds generated from the inverter circuit 51 using operation sounds generated from vehicle devices other than the electric fans 21, 41.

(14) In each embodiment described above, examples are described where the drive device 50 is applied to an electric vehicle or a hybrid vehicle. However, this is not intended to be limiting, and the drive device 1 may be applied to vehicles including a propulsion engine other than an electric vehicle or a hybrid vehicle.

(15) In the second embodiment described above, an example is described where the initial predetermined period, during which the carrier wave Ka is used in the drive circuit 53, is set based on the refrigerant pressure difference. However, instead of this, either the following (a) or (b) are also contemplated. (a) In the third, fourth, fifth, sixth, and other embodiments described above, the control circuit 55 sets the initial predetermined period, during which the carrier wave Ka is used in the drive circuit 53, based on the refrigerant pressure difference. (b) In the first embodiment and other embodiments described above, the control circuit 55 sets the initial predetermined period during, which the carrier wave Kb is used in the drive circuit 53, based on the refrigerant pressure difference.

(16) It should be noted that the present disclosure is not limited to the embodiments described above, and can be appropriately modified. In addition, each of the above-described embodiments is related to each other, and can be appropriately combined with each other except for a case where the combination is apparently impossible. In the above-described respective embodiments, needlessly to say, elements configuring the embodiments are not necessarily indispensable as a matter of course, except when the elements are particularly specified as indispensable and the elements are considered as obviously indispensable in principle. In the above-described respective embodiments, when numerical values such as the number, figures, quantity, a range of configuration elements in the embodiments are described, the numerical values are not limited to a specific number, except when the elements are particularly specified as indispensable and the numerical values are obviously limited to the specific number in principle. In the above-described respective embodiments, when a shape, a positional relationship, and the like of a configuration element and the like are mentioned, the shape, the positional relationship, and the like are not limited thereto excluding a particularly stated case and a case of being limited to specific shape, positional relationship, and the like based on the principle.

Steps S117, S118, S119, S118A, S119A correspond to a restart unit. Step S113 corresponds to a determination unit, and the switching elements SW1, SW2, SW3 correspond to positive bus switching elements. The switching elements SW4, SW5, SW6 correspond to negative bus switching elements. Step S107, step S122 correspond to a calculation unit.

Step S106 corresponds to a stop unit, step S103 corresponds to a normal control unit, and steps S115, S116 correspond to a masking unit or a pressure control unit. The condenser 20 corresponds to a first heat exchanger, and the electric fan 21 corresponds to a vehicle device, a first ventilator. The evaporator 40 corresponds to a second heat exchanger. The electric fan 41 corresponds to a vehicle device, a second ventilator. The drive device 50 corresponds to a drive unit. The current sensor corresponds to a current detection unit, the temperature sensor 58 corresponds to a temperature detection unit, the high voltage source 70 corresponds to a direct current power source. Further, the differential pressure determination information corresponds to a pressure difference information. Further, the memory in the above described embodiments is a non-transitory tangible storage medium.

What is claimed is:

1. A drive device of an electric compressor that drives a compression mechanism to compress a fluid due to a rotation force of a rotor which is rotated by a rotating magnetic field generated from a stator coil of a synchronous motor, the drive device comprising:
   an inverter circuit formed of a plurality of switching elements;
   a drive unit that switches the plurality of switching elements to flow an alternating current from the inverter circuit to the stator coil based on a direct current voltage output from a direct current power source to generate the rotating magnetic field from the stator coil;
   a determination unit that, when the compression mechanism restarts after a stoppage of the compression mechanism, determines whether a pressure difference between a fluid intake side and a fluid discharge side of the compression mechanism is equal to or above a predetermined value; and
   a restart unit that
      sets a number of times that the switching elements are switched per unit time during an initial predetermined period when the compression mechanism begins to restart, and
      controls the drive unit such that an alternating current flows from the inverter circuit to the stator coil, the alternating current causing a rotation speed of the rotor to increase until a predetermined rotation speed when the compression mechanism restarts, wherein
   the restart unit sets the number of times that the switching elements are switched per unit time to be lower when the determination unit determines that the pressure difference is equal to or above the threshold as compared to when the determination unit determines that the pressure difference is less than the threshold, wherein
   the plurality of switching elements are formed of a plurality of pairs of switching elements including a pair of switching elements connected in series for each phase, and the plurality of pairs of switching elements are connected in parallel between a positive bus and a negative bus,
   the restart unit sets a voltage command wave of each phase for the alternating current, which causes the rotation speed of the rotor to increase until the predetermined rotation speed, to flow from the inverter circuit to the stator coil, the voltage of the voltage command wave periodically changing,
   the drive unit
      turns on a positive bus switching element and turns off a negative bus switching element among the pair of switching elements of each phase when the voltage command wave of each phase is greater than a carrier wave whose voltage periodically changes, and
      turns on the negative bus switching element and turns off the positive bus switching element when the voltage command wave of each phase is smaller than the carrier wave, and
   the restart unit sets the number of times that the switching elements are switched per unit time by setting a carrier frequency which is a frequency of the carrier wave.

2. The drive device of the electric compressor of claim 1, further comprising:
   a calculation unit that obtains a pressure difference information representing the pressure difference, wherein
   the restart unit sets the carrier frequency, which is used by the drive unit during the predetermined period, based on the pressure difference information, and
   the restart unit sets the carrier frequency such that as the pressure difference is greater, the carrier frequency is lower.

3. The drive device of the electric compressor of claim 2, wherein
   the restart unit sets the carrier frequency, which is used by the drive unit during the predetermined period, based on the pressure difference information, and also sets the predetermined period, during which the set carrier frequency is used by the drive unit, based on the pressure difference information, and
   the restart unit sets the predetermined period such that as the pressure difference is greater, the predetermined period is longer.

4. The drive device of the electric compressor of claim 2, further comprising:
   a stop unit that controls the drive unit so as to cause the compression mechanism to stop, wherein
   the calculation unit, when the stop unit is being executed, uses a detection temperature of a temperature detection unit, which detects a temperature of the inverter circuit, as the pressure difference information.

5. The drive device of the electric compressor of claim 2, further comprising:
   a stop unit that controls the drive unit so as to cause the compression mechanism to stop, wherein
   the calculation unit, when the stop unit is being executed, uses a detection value of a temperature detection unit, which detects a temperature of the inverter circuit, or a detection value of a current detection unit, which detects a current of alternating current flowing from the inverter circuit to the stator coil, as the pressure difference information.

6. The drive device of the electric compressor of claim 2, further comprising:
   a normal control unit that, after the execution of the restart unit, controls the drive unit such that a detection value of a current detection unit, which detects a current of the alternating current flowing from the inverter circuit to the stator coil, approaches a current command value, wherein
   the calculation unit, when the normal control unit is being executed, uses a detection value of a temperature detection unit, which detects a temperature of the inverter circuit, the detection value detected by the current detection unit, or the current command value as the pressure difference information.

7. The drive device of the electric compressor of claim 1, wherein
   the direct current power source is connected between the positive bus and the negative bus.

8. The drive device of the electric compressor of claim 1, wherein
   the direct current power source is connected between a star connection neutral point of the stator coil and one of the positive bus or the negative bus.

9. The drive device of the electric compressor of claim 1, further comprising:
a masking unit, wherein
the drive device is applied to a vehicle including a vehicle device that generates operation sounds when operated,
the masking unit performs a control of operating the vehicle device when the determination unit determines that the pressure difference is equal to or above the threshold, and
the masking unit causes the vehicle device to generate the operation sounds when sounds are generated from the electric compressor due to the carrier frequency which is the frequency of the carrier wave when the pair of switching elements in each phase switches.

10. The drive device of the electric compressor of claim 1, further comprising:
a pressure control unit, wherein
the drive device is mounted to a vehicle that includes
the electric compressor which compresses refrigerant as the fluid,
a first heat exchanger that dissipates heat from the refrigerant discharged from the electric compressor to vehicle cabin external air,
a second heat exchanger that absorbs heat from vehicle cabin internal air into the refrigerant flowing from the first heat exchanger,
a pressure reducing valve that reduces a pressure of the refrigerant flowing from a refrigerant outlet of the first heat exchanger toward a refrigerant inlet of the second heat exchanger, the pressure reducing valve forming a refrigeration cycle together with the electric compressor, the first heat exchanger, and the second heat exchanger,
a first ventilator that causes an airflow of the vehicle cabin external air passing through the first heat exchanger, and
a second ventilator that causes an airflow of the vehicle cabin internal air passing through the second heat exchanger, and
the pressure control unit causes heat to exchange between the refrigerant and an airflow to reduce the pressure difference when the determination unit determines that the pressure difference is equal to or above the threshold by, prior to the restart unit controlling the drive unit, controlling at least one ventilator among the first ventilator and the second ventilator to generate the airflow which passes through a corresponding heat exchanger among the first heat exchanger and the second heat exchanger which corresponds to the at least one ventilator.

11. A drive device of an electric compressor that drives a compression mechanism to compress a fluid due to a rotation force of a rotor which is rotated by a rotating magnetic field generated from a stator coil of a synchronous motor, the drive device comprising:
an inverter circuit formed of a plurality of switching elements;
a drive unit that switches the plurality of switching elements to flow an alternating current from the inverter circuit to the stator coil based on a direct current voltage output from a direct current power source to generate the rotating magnetic field from the stator coil;
a determination unit that, when the compression mechanism restarts after a stoppage of the compression mechanism, determines whether a pressure difference between a fluid intake side and a fluid discharge side of the compression mechanism is equal to or above a predetermined value; and
a restart unit that
sets a number of times that the switching elements are switched per unit time during an initial predetermined period when the compression mechanism begins to restart, and
controls the drive unit such that an alternating current flows from the inverter circuit to the stator coil, the alternating current causing a rotation speed of the rotor to increase until a predetermined rotation speed when the compression mechanism restarts; and
a masking unit, wherein
the restart unit sets the number of times that the switching elements are switched per unit time to be lower when the determination unit determines that the pressure difference is equal to or above the threshold as compared to when the determination unit determines that the pressure difference is less than the threshold
the drive device is applied to a vehicle including a vehicle device that generates operation sounds when operated,
the masking unit performs a control of operating the vehicle device when the determination unit determines that the pressure difference is equal to or above the threshold, and
the masking unit causes the vehicle device to generate the operation sounds when sounds are generated from the electric compressor due to a carrier frequency which is a frequency of a carrier wave when the pair of switching elements in each phase switches.

12. A drive device of an electric compressor that drives a compression mechanism to compress a fluid due to a rotation force of a rotor which is rotated by a rotating magnetic field generated from a stator coil of a synchronous motor, the drive device comprising:
an inverter circuit formed of a plurality of switching elements;
a drive unit that switches the plurality of switching elements to flow an alternating current from the inverter circuit to the stator coil based on a direct current voltage output from a direct current power source to generate the rotating magnetic field from the stator coil;
a determination unit that, when the compression mechanism restarts after a stoppage of the compression mechanism, determines whether a pressure difference between a fluid intake side and a fluid discharge side of the compression mechanism is equal to or above a predetermined value;
a restart unit that
sets a number of times that the switching elements are switched per unit time during an initial predetermined period when the compression mechanism begins to restart, and
controls the drive unit such that an alternating current flows from the inverter circuit to the stator coil, the alternating current causing a rotation speed of the rotor to increase until a predetermined rotation speed when the compression mechanism restarts; and
a pressure control unit, wherein
the restart unit sets the number of times that the switching elements are switched per unit time to be lower when the determination unit determines that the pressure difference is equal to or above the threshold as compared to when the determination unit determines that the pressure difference is less than the threshold, the drive device is mounted to a vehicle that includes the electric compressor which compresses refrigerant as the fluid, a first heat exchanger that dissipates heat from the refrigerant discharged from the electric compressor to vehicle cabin external air, a second heat exchanger that absorbs heat from vehicle cabin internal air into the refrigerant flowing from the first heat exchanger, a pressure reducing valve that reduces a pressure of the refrigerant flowing from a refrigerant outlet of the first heat exchanger toward a refrigerant inlet of the second heat exchanger, the pressure reducing valve forming a refrigeration cycle together with the electric compressor, the first heat exchanger, and the second heat exchanger, a first ventilator that causes an airflow of the vehicle cabin external air passing through the first heat exchanger, and a second ventilator that causes an airflow of the vehicle cabin internal air passing through the second heat exchanger, and the pressure control unit causes heat to exchange between the refrigerant and an airflow to reduce the pressure difference when the determination unit determines that the pressure difference is equal to or above the threshold by, prior to the restart unit controlling the drive unit, controlling at least one ventilator among the first ventilator and the second ventilator to generate the airflow which passes through a corresponding heat exchanger among the first heat exchanger and the second heat exchanger which corresponds to the at least one ventilator.

* * * * *